United States Patent
Mayster et al.

(10) Patent No.: US 12,553,726 B2
(45) Date of Patent: Feb. 17, 2026

(54) DISCOVERY AND EVALUATION OF MEETING LOCATIONS USING IMAGE CONTENT ANALYSIS

(71) Applicant: Google LLC, Mountain View, CA (US)

(72) Inventors: Yan Mayster, Aurora, CO (US); Brian Edmond Brewington, Superior, CO (US); Brian Daniel Shucker, Superior, CO (US); Vishal Goenka, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 72 days.

(21) Appl. No.: 18/740,245

(22) Filed: Jun. 11, 2024

(65) Prior Publication Data

US 2024/0328795 A1 Oct. 3, 2024

Related U.S. Application Data

(63) Continuation of application No. 16/972,496, filed as application No. PCT/US2019/012522 on Jan. 7, 2019, now Pat. No. 12,044,536.

(Continued)

(51) Int. Cl.
*G01C 21/34* (2006.01)
*G06F 40/30* (2020.01)
(Continued)

(52) U.S. Cl.
CPC ..... *G01C 21/3438* (2013.01); *G01C 21/3415* (2013.01); *G06F 40/30* (2020.01); *G06Q 10/02* (2013.01); *H04W 4/029* (2018.02)

(58) Field of Classification Search
CPC . G01C 21/3438; G01C 21/3415; G06F 40/30; G06Q 10/02; G06Q 10/1093;
(Continued)

(56) References Cited

U.S. PATENT DOCUMENTS 6,751,548 B2 * 6/2004 Fox ............... G01C 21/3461
701/400
8,825,383 B1 * 9/2014 Kirmse ............ G01C 21/3438
701/426

(Continued)

FOREIGN PATENT DOCUMENTS

| EP | 2372305 | 10/2011 |
|---|---|---|
| WO | WO 2017/0007651 | 1/2017 |
| WO | WO 2017/0070011 | 4/2017 |

OTHER PUBLICATIONS

International Preliminary Report on Patentability for PCT/US2019/012522, mailed on Jul. 1, 2021, 8 pages.

(Continued)

*Primary Examiner* — Richard M Camby
(74) *Attorney, Agent, or Firm* — DORITY & MANNING, P.A.

(57) ABSTRACT

Provided are methods, systems, devices, apparatuses, and tangible non-transitory computer readable media for navigation and geocoding. The disclosed technology can perform operations including accessing location data and semantic tags. The location data can include information associated with locations including the location of a carrier and the location of a passenger. The semantic tags can include information associated with features of the locations. The location data and the semantic tags that satisfy meeting criteria can be identified. The meeting criteria can be associated with a suitability of a location for the carrier and the passenger. A meeting location for the carrier and the passenger can be determined based on the location data and the semantic tags that satisfy the meeting criteria. Furthermore, indications associated with the meeting location can be generated based on the features of the meeting location.

20 Claims, 12 Drawing Sheets

Related U.S. Application Data

(60) Provisional application No. 62/780,695, filed on Dec. 17, 2018.

(51) Int. Cl.
  *G06Q 10/02* (2012.01)
  *H04W 4/029* (2018.01)

(58) Field of Classification Search
  CPC ..... G06Q 50/40; G06Q 10/047; H04W 4/029; G08G 1/202
  See application file for complete search history.

(56) References Cited

U.S. PATENT DOCUMENTS

| | | | |
|---|---|---|---|
| 9,264,849 B1 | 2/2016 | Kahn et al. | |
| 10,900,795 B2* | 1/2021 | Mazzella | G01C 21/343 |
| 2011/0191019 A1* | 8/2011 | Holsinger | G01C 21/343 |
| | | | 701/533 |
| 2015/0073711 A1 | 3/2015 | Brewington et al. | |
| 2016/0086391 A1 | 3/2016 | Ricci | |
| 2016/0364678 A1 | 12/2016 | Cao | |
| 2017/0293950 A1 | 10/2017 | Rathod | |
| 2018/0023967 A1 | 1/2018 | Mazzella et al. | |
| 2018/0328747 A1 | 11/2018 | Farmer et al. | |
| 2019/0095965 A1 | 3/2019 | Stayner et al. | |
| 2019/0182616 A1* | 6/2019 | Kamath | H04L 67/306 |
| 2019/0279440 A1 | 9/2019 | Ricci | |
| 2019/0376801 A1 | 12/2019 | Whitt et al. | |
| 2019/0376805 A1 | 12/2019 | Whitt et al. | |
| 2020/0012971 A1 | 1/2020 | Chouinard et al. | |

OTHER PUBLICATIONS

International Search Report for PCT/US2019/012522, mailed Mar. 14, 2019, 3 pages.

* cited by examiner

DISCOVERY AND EVALUATION OF MEETING LOCATIONS USING IMAGE CONTENT ANALYSIS

RELATED APPLICATIONS

The present application is a continuation of U.S. application Ser. No. 16/972,496 having a filing date of Dec. 4, 2020, which is based upon and claims the right of priority under 35 U.S.C. § 371 to International Application No. PCT/US2019/012522 filed on Jan. 7, 2019, which claims the benefit of U.S. Provisional Application Ser. No. 62/780,695 filed Dec. 17, 2018. Applicant claims priority to and the benefit of each of such applications and incorporates all such applications herein by reference in their entirety.

FIELD

The present disclosure relates generally to navigation and image content analysis. More particularly, the present disclosure relates to determining meeting locations using a computing device.

BACKGROUND

Operations associated with the state of a geographic area can be implemented on a variety of computing devices. These operations can include processing data associated with the geographic area for later access and use by a user or computing system. Further, the operations can include exchanging data with remote computing systems. However, the types of operations that are performed and the uses to which those operations are applied can vary over time, as can the underlying hardware that implements the operations. Accordingly, there are different ways to leverage computing resources associated with determining the state of a geographic area.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method of providing navigational instructions. The computer-implemented method can include accessing, by a computing system including one or more processors, location data and a plurality of semantic tags. The location data can include information associated with a plurality of locations including a location of a carrier and a location of a passenger. The plurality of semantic tags can include information associated with one or more features of the plurality of locations. The computer-implemented method can also include identifying, by the computing system, the location data and the plurality of semantic tags that satisfy one or more meeting criteria associated with a suitability of a location for the carrier and the passenger. The computer-implemented method can include determining, by the computing system, one or more meeting locations for the carrier and the passenger based at least in part on the location data and the plurality of semantic tags that satisfy the one or more meeting criteria. Furthermore, the computer-implemented method can include generating, by the computing system, one or more indications associated with at least one meeting location of the one or more meeting locations based at least in part on the one or more features of the at least one meeting location.

Another example aspect of the present disclosure is directed to one or more tangible non-transitory computer-readable media storing computer-readable instructions that when executed by one or more processors cause the one or more processors to perform operations. The operations can include accessing location data and a plurality of semantic tags. The location data can include information associated with a plurality of locations including a location of a carrier and a location of a passenger. The plurality of semantic tags can include information associated with one or more features of the plurality of locations. The operations can also include identifying the location data and the plurality of semantic tags that satisfy one or more meeting criteria associated with a suitability of a location for the carrier and the passenger. The operations can include determining one or more meeting locations for the carrier and the passenger based at least in part on the location data and the plurality of semantic tags that satisfy the one or more meeting criteria. Furthermore, the operations can include generating one or more indications associated with at least one meeting location of the one or more meeting locations based at least in part on the one or more features of the at least one meeting location.

Another example aspect of the present disclosure is directed to a computing system including: one or more processors; and one or more non-transitory computer-readable media storing instructions that when executed by the one or more processors cause the one or more processors to perform operations. The operations can include accessing location data and a plurality of semantic tags. The location data can include information associated with a plurality of locations including a location of a carrier and a location of a passenger. The plurality of semantic tags can include information associated with one or more features of the plurality of locations. The operations can also include identifying the location data and the plurality of semantic tags that satisfy one or more meeting criteria associated with a suitability of a location for the carrier and the passenger. The operations can include determining one or more meeting locations for the carrier and the passenger based at least in part on the location data and the plurality of semantic tags that satisfy the one or more meeting criteria. Furthermore, the operations can include generating one or more indications associated with at least one meeting location of the one or more meeting locations based at least in part on the one or more features of the at least one meeting location.

Other aspects of the present disclosure are directed to various systems, apparatuses, non-transitory computer-readable media, user interfaces, and electronic devices. These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
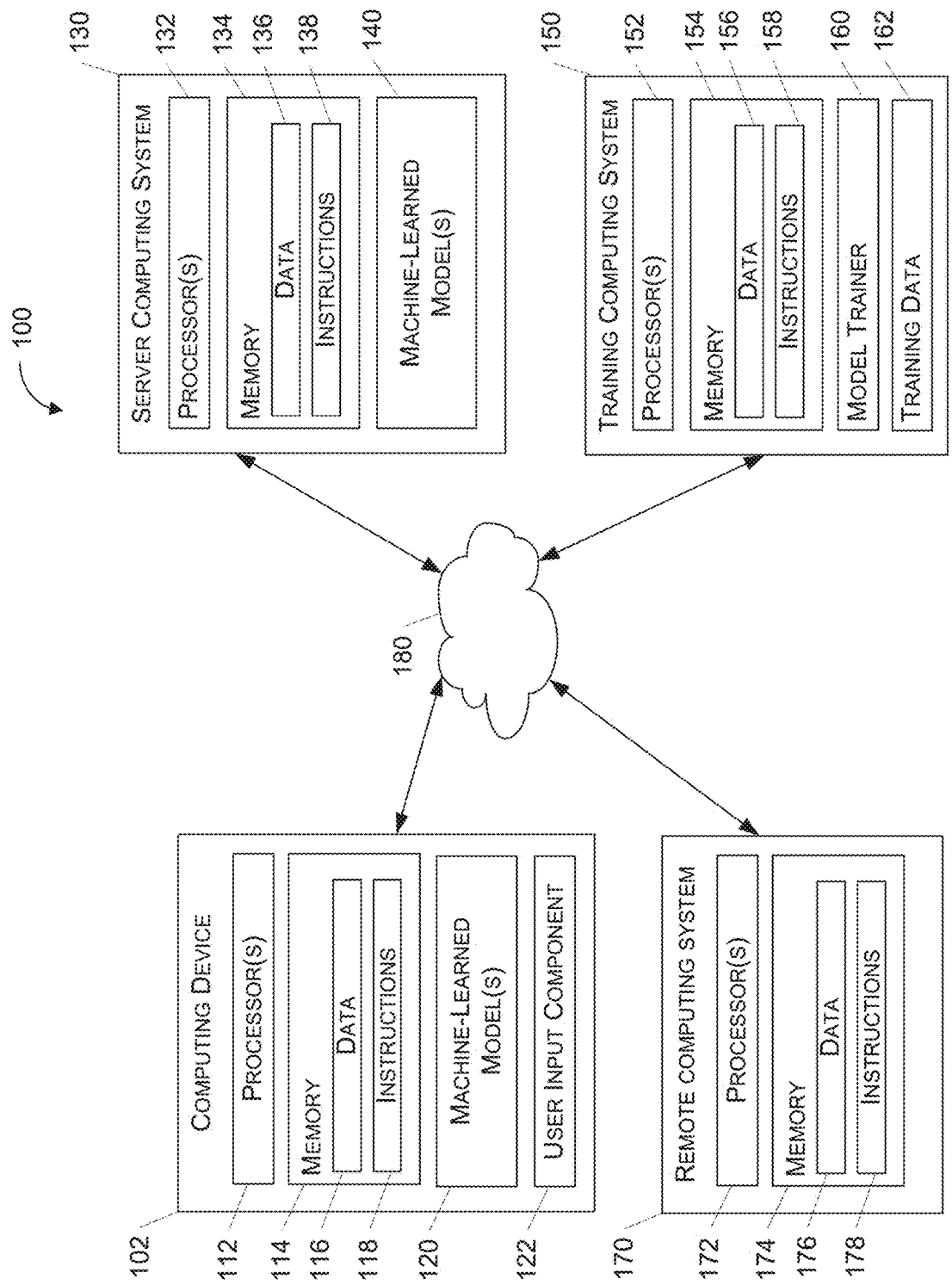
FIG. 1 depicts a diagram of an example system according to example embodiments of the present disclosure.

Reference numerals that are repeated across plural figures are intended to identify the same features in various implementations.

DETAILED DESCRIPTION

Generally, the present disclosure is directed to the determination of a meeting location for use in navigation or coordination of meetings between parties. The present disclosure also describes the generation of indications associated with a meeting location based on features of the meeting location that satisfy meeting criteria associated with the suitability of the location for parties which can include a carrier and a passenger. Furthermore, the parties may have different modalities of mobility, which may affect the visibility and/or accessibility of a given location to the parties (e.g., one party may be travelling in a vehicle while another party may be travelling on foot). In particular, the disclosed technology can include a computing system that receives data including location data and semantic tags associated with features of images (e.g., photographs of an area captured from a variety of vantage points). The location data can include maps of a geographic area and the locations of a carrier (e.g., a driver of a vehicle) and a passenger (e.g., a passenger intending to meet with the carrier) and the semantic tags can be based on images that have been processed by a machine-learned model or other image content analysis system configured to detect and identify various features of the images. Further, the semantic tags can be associated with the geographic area, including particular locations (e.g., latitude, longitude, and altitude) within the geographic area and other information (e.g., the amenities at each location).

The computing system can then identify the location data and semantic tags that include information that satisfy meeting criteria associated with the suitability of a meeting location for the carrier and the passenger (e.g., a safe, easily visible, and convenient location that is not too far away). The computing system can also determine meeting locations for the carrier and the passenger based on the location and semantic tags that satisfy the meeting criteria. Furthermore, the computing system can generate indications including directions to the meeting location and a description of the meeting location that can be used to facilitate navigation. As such, the disclosed technology can more effectively determine meeting locations for use by individuals including a carrier and a passenger.

The disclosed technology may thus enable the identification of a location at which users may more effectively and/or efficiently interact and/or meet. In particular, through determination of the state of the physical environment, the behavior of users may be influenced to facilitate greater efficiency. Moreover, identification of an appropriate location may lead to improved safety by avoiding circumstances in which one party is exposed to an environment to which they are not suited (for example, there may be locations which are not suited to a party travelling on foot). The technology may also allow users to more effectively and/or efficiently navigate to and identify the specified meeting location. In some examples, the meeting locations may be referenced in a series of turn-by-turn navigational instructions which may be provided to a carrier in a vehicle and a passenger on foot. The described technology may thus assist the carrier in performing more effectively the technical task of driving a vehicle to a specified meeting location by means of a continued and/or guided human-machine interaction process.

By way of further example, a computing system (e.g., a computing system in a vehicle) operated by a passenger desiring a ride (e.g., a ride on a vehicle) to another location can access data (e.g., a combination of locally stored and/or remotely accessible data) associated with a geographic area. The data can include location data (e.g., maps of an area including the location of a carrier and a passenger) and semantic tags that indicate features of locations in the geographic area that were previously identified using image recognition (e.g., a machine-learned model trained to detect features present in images of a location). The computing system can then determine one or more meeting locations for the carrier and the passenger. For example, the computing system can determine a set of meeting locations that are safe and within convenient walking distance for the passenger. The computing system can then provide a set of instructions (e.g., audible directions generated through a smart phone of the passenger and/or textual or graphical instructions provided on a display of the passenger's smartphone) to the passenger to assist in navigation. At the same time, another set of directions to the meeting location can be generated for use by the carrier. As such, the disclosed technology provides a variety of improvements in navigation and meeting coordination.

In some embodiments, an image content analysis system can analyze the semantic content of an image and provide a detailed description of the entities found in the form of semantic tags. The number of such semantic tags can be significant (e.g., thousands), thus image content analysis systems can have very broad scope in terms of the content the image content analysis systems can describe. Further, these image content analysis systems can be configured to process vast collections of imagery, for example, a street-level corpus including images captured from a street level perspective. Further, the system can utilize the image content analysis of street level imagery and/or other images (e.g., user-generated imagery and/or publicly accessible street-level imagery) for the purpose of determining meeting locations including passenger pick-up locations that can be used for various transportation related services and/or applications.

In one embodiment, semantic tags can be used to create semantic profiles of locations, which can be supplemented with location data (e.g., map data including information associated with known locations). These locations may not necessarily be distinct points and can be cells (e.g., areas of a predefined size) on a grid that covers an area (e.g., a city, state, or the World) at a predetermined resolution (e.g., squares that are two meters per side). The semantic tags can be located and binned by such cells using the location of the image (e.g., a location associated with street level images), a semantic tag viewport, and pose information for the image (e.g., the direction the camera was facing when the image was captured). Thus, in each cell the items that exist in it and/or are likely unobstructed and visible from it can be determined.

To further reduce potential noise in the image content analysis responses and take advantage of the density of street level imagery (which in many areas can include multiple runs per street with many close images in a given run), the number of detections for a specific semantic tag can be compared to a threshold to determine semantic tags of interest. Further, the image times (e.g., times at which images were captured) for each semantic tag can be determined so that priority can be given to the most recent detections. Additionally, for each of the detections, an image detection box can be used to determine how visible and/or prominent that detection is from a given location.

Further, the semantic tags and/or cells can be filtered so that only those semantic tags and/or cells that contain information useful to an application (e.g., an application used to determine a meeting location for a carrier and a passenger) are stored. In particular, a vocabulary of terms (e.g., key words) specific to this application can be compiled including words that are associated with a set of visual cues that are easily recognized by a carrier and/or a passenger. Using the disclosed technology, a large array of entities that may serve as visual cues can be identified. These entities can include visible business name signs, map features (e.g., parks and/or schools), landmarks (fountains, statues, and/or monuments), traffic signage and traffic elements ("STOP" signs, traffic lights, and/or roundabouts), elements of urban landscapes (e.g., benches, lampposts, flower beds, and/or parking meters), pavement types (e.g., sidewalk), various colored stripe marks, parking zones (e.g., "loading zone", "no parking"), and/or architectural features (e.g., window types and/or canopies).

Given a query point and radius, nearby cells with sufficient content can be collected and ranked based at least in part on proximity, case of walking instructions (e.g., number of turns required to travel to a location), the amount and visibility of semantic content that can be easily recognized by a passenger to be picked up compared to the amount and visibility of semantic content easily recognized by a carrier, and/or confidence in the accuracy of the content detections (partially based on the imagery times and partially on the number of same semantic tag detections).

Further, the case of recognition can depend on the size and relative prominence of each semantic entity as it can be viewed both from the location itself and from other locations as either a carrier and/or a passenger approaches that location along one or more recommended routes or paths. So, for a given dataset with known numerical ranges for each of these characteristics, a simple objective function can be constructed with specific weights for each of the characteristics. The top-scoring cells and/or their adjacent neighboring cells (which can be used for directions context) can be selected and their locations can be presented as options to a user (e.g., a carrier and/or a passenger). Further, concise descriptions can be generated for each such location using, for example, natural language processing techniques or retrieval from a database of curated textual descriptions.

Figure 2:
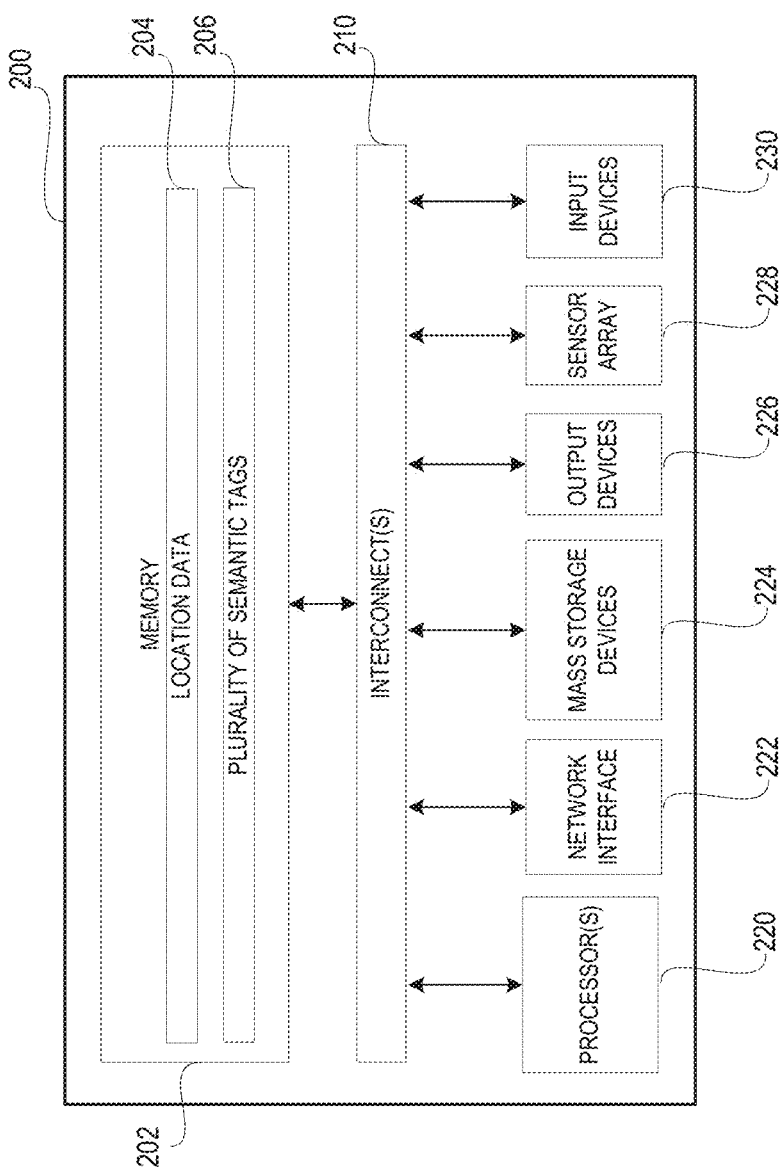
FIG. 2 depicts a diagram of an example device according to example embodiments of the present disclosure.

In some embodiments, the disclosed technology can include a computing system (e.g., a geographic computing system) that can include one or more computing devices (e.g., devices with one or more computer processors and a memory that can store one or more instructions) that can send, receive, process, generate, and/or modify data (e.g., data including location data associated with a plurality of locations and semantic tags associated with images) including one or more information patterns or structures that can be stored on one or more memory devices (e.g., one or more random access memory devices) and/or one or more storage devices (e.g., one or more hard disk drives and/or one or more solid state memory drives); and/or one or more signals (e.g., electronic signals). The data and/or one or more signals can be exchanged by the computing system with various other systems and/or devices including a plurality of service systems (e.g., one or more remote computing systems, one or more remote computing devices, and/or one or more software applications operating on one or more computing devices) that can send and/or receive data including location data and semantic tags associated with images (e.g., digital images associated with data including geographic location, time of image capture, and/or one or more descriptions of one or more other features of the images). In some embodiments, the computing system (e.g., the geographic computing system) can include one or more features of the device 102 that is depicted in FIG. 1 and/or the computing device 200 that is depicted in FIG. 2. Further, the network computing system can be associated with one or more machine-learned models that include one or more features of the one or more machine-learned models 120 that are depicted in FIG. 1

Furthermore, the computing system can include specialized hardware (e.g., an application specific integrated circuit) and/or software that enables the computing system to perform one or more operations specific to the disclosed technology including accessing location data (e.g., location data including the location of a carrier and a passenger), semantic tags (e.g., accessing locally stored semantic tags and/or accessing semantic tags by receiving the semantic tags from a remote computing device) that can be associated with a plurality of images, determining locations that are suitable for use as a meeting location by a carrier and a passenger, and generating indications associated with the meeting locations (e.g., directions to the meeting location and/or a description of the meeting location).

The geographic computing system can access location data and/or a plurality of semantic tags. The location data can include information associated with a plurality of locations (e.g., geographic locations including latitude, longitude, and/or altitude of each location) including a location (e.g., a set of geographic coordinates including latitude, longitude, and altitude) of one or more parties that can include a carrier (e.g., a driver of a vehicle) and a location of a passenger (e.g., a passenger in need of a vehicle to transport the passenger to another location). In some embodiments, the one or more parties can include one or more carriers and/or one or more passengers. Further, each of the one or more carriers and/or the one or more passengers can be located at various combinations of locations (e.g., several passengers at one location and several other passengers at another location).

In some embodiments, the location data can include information associated with the plurality of locations including one or more maps which can indicate the location of roads (e.g., streets, highways, and/or alleyways), buildings, bodies of water, waterways, bridges, tunnels, overpasses, and/or underpasses. Further, the location data can include information associated with traffic regulations (e.g., speed limits in a location, the locations of traffic lights, and/or the locations of stop signs), traffic flow patterns (e.g., the amount of vehicular or foot traffic in an area), and/or the locations of one or more hazards including construction zones.

In some embodiments, the plurality of semantic tags can include information associated with the one or more features of each location of the plurality of locations that are visible from other locations of the plurality of locations, a geographic location associated with each of the plurality of locations, and/or physical dimensions (e.g., an area in square meters) of each of the plurality of locations.

Further, the plurality of semantic tags can include information associated with one or more features (e.g., one or more features of a location of the plurality of locations) including: visual features (e.g., the appearance of one or more objects at a location of the plurality of locations); physical dimensions of one or more objects at a location of the plurality of locations; and/or object identities (e.g., the identity of objects at each location of the plurality of locations). Furthermore, the one or more features of the plurality of locations can include one or more features of: objects in each location of the plurality of locations including buildings, utility poles, trees, mail boxes, benches, and/or garbage cans; one or more surfaces of each location of the plurality of locations (e.g., paved roads, lawns, and/or bodies of water); traffic signage (e.g., traffic signs and/or traffic indications on roads); and/or light features including the location of street lights. Additionally, each of the plurality of semantic tags and/or the location data can be associated with information including: a location (e.g., a street address and/or an altitude, latitude, and longitude associated with a location and/or a semantic tag); a time of day (e.g., a time of day when a semantic tag was generated, modified, and/or most recently accessed); and/or a date (e.g., a date when a semantic tag was generated, modified, and/or most recently accessed).

In some embodiments, each semantic tag of the plurality of semantic tags can be associated with one or more features depicted by an image of the plurality of images. For example, each semantic tag can provide one or more semantic descriptions of one or more objects included within a scene depicted by one of the plurality of images. The plurality of images can include one or more digital images (e.g., a two dimensional image) of a portion of an environment (e.g., an image of a portion of a location of the plurality of locations). Further, the plurality of images can be encoded in any type of image format including a combination of raster images (e.g., bitmaps comprising an array of pixels) and/or vector images (e.g., polygonal representations of images based on positions of coordinates including x and y axes of a two-dimensional plane). The images can include still images, image frames from a movie, and/or other types of imagery including LIDAR imagery, and/or RADAR imagery.

Examples of digital image formats used by the plurality of images can include JPEG (Joint Photographic Experts Group), BMP (Bitmap), TIFF (Tagged Image File Format), PNG (Portable Network Graphics), and/or GIF (Graphics Interchange Format). The images can be collected from various sources including user-submitted imagery, imagery in the public domain (e.g., anonymized imagery obtained via web crawl), and/or street-level panoramic imagery.

By way of example, the geographic computing system can receive data including information associated with the location data and/or the plurality of semantic tags via a communication network (e.g., a wireless and/or wired network including a LAN, WAN, or the Internet) through which one or more signals (e.g., electronic signals) and/or data can be sent and/or received.

The geographic computing system can identify the location data and/or the plurality of semantic tags that satisfy one or more meeting criteria associated with a suitability of a location for the carrier and the passenger. For example, the geographic computing system can access data and/or information associated with the location data and/or the plurality of semantic tags that include information associated with the one or more features of the plurality of locations that satisfy one or more meeting criteria associated with suitability of a location for the carrier and the passenger. Further, the one or more features of each of the plurality of locations can be compared to each of the one or more meeting criteria that can be used to determine a meeting location that is suitable for the carrier and the passenger.

Furthermore, the suitability of a location for the carrier and/or the passenger can be associated with one or more other characteristics of the location including: the frequency of one or more features (e.g., how uncommon features at a location occur relative to other locations); the distinctiveness of one or more features at a location (e.g., the unusualness of a feature at a location); the prominence of one or more features at a location (e.g., the size and/or visibility of a feature at a location); the visual constancy of a feature at a location (e.g., the extent to which the appearance of a feature changes over time); the locational constancy of a feature of a location (e.g., will the feature remain in the same place over time); and/or the context of a feature of a location (e.g., the one or more features that are in close proximity or contact with a feature of a location).

Satisfaction of the one or more meeting criteria can be based, for example, on a feature being prominent (e.g., a large neon sign mounted on a tall pole). Thus, in one example, an image content analysis system can be used to determine the prominence of each feature of a location, which can then be used to guide selection of a location for use as a meeting location. As one example, for each location, an area (e.g., a ten meter by ten meter area) around the location can be analyzed to identify which features associated with the location are most prominent (e.g., a size and/or height threshold can establish that the neon sign on the tall pole is prominent).

The geographic computing system can determine one or more meeting locations for the carrier and the passenger based at least in part on the location data and/or the plurality of semantic tags that satisfy the one or more meeting criteria. For example, the geographic computing system can determine that the one or more meeting locations include a predetermined number (e.g., one location) of the plurality of locations that satisfies the one or more meeting criteria. By way of further example, the geographic computing system can determine that the one or more meeting locations for the carrier and the passenger include a predetermined portion (e.g., all, half, or one quarter) of the plurality of locations that satisfies the one or more meeting criteria. Furthermore, the geographic computing system can determine that the one or more meeting locations are within a predetermined distance (e.g., within ten meters) of the plurality of locations that satisfies the one or more meeting criteria.

By way of example, the one or more meeting locations can be based at least in part on: the safety of a location (e.g., locations that are safely accessible to a pedestrian via a crosswalk and/or sidewalk); the proximity of a location (e.g., how far away meeting location is from the carrier and/or the passenger); the visibility of a location (e.g., how easily a location can be seen by a carrier and/or a passenger); and/or the accessibility of a location (e.g., how easily and/or conveniently the meeting location can be accessed by a pedestrian and/or a vehicle).

The geographic computing system can generate one or more indications associated with at least one meeting location based at least in part on the one or more features of the at least one meeting location of the one or more meeting locations. Further, the amount of meeting locations included in the at least one meting location of the one or more meeting locations can be a predetermined amount (e.g., a single meeting location, a predetermined portion of the one or more meeting locations, or a predetermined number of the one or more meeting locations) or based at least in part on one or more criteria (e.g., the meeting location that is closest to the passenger).

By way of example, the geographic computing system can generate one or more textual indications including the address of a meeting location and one or more visual indications including an image that can be displayed on a display device of the for the carrier and/or the passenger.

In some embodiments, the one or more indications can include one or more textual descriptions of the one or more meeting locations, one or more auditory descriptions of the one or more meeting locations, or one or more images of the one or more meeting locations (e.g., photographs of the one or more meeting locations).

In some embodiments, the geographic computing system can generate one or more descriptions of the plurality of locations within a predetermined distance of the at least one location. For example, the geographic computing system can generate one or more descriptions of the one or more features (e.g., features of buildings) associated with the plurality of semantic tags that are associated with the plurality of locations within the predetermined distance of the at least one location. By way of further example, the geographic computing system can generate one or more natural language descriptions including one or more natural language textual descriptions (e.g., natural language textual descriptions generated on a display device associated with the geographic computing system) and/or one or more audible descriptions (e.g., natural language audible descriptions using a synthetic voice and/or a pre-recorded voice).

In some embodiments, the geographic computing system can determine a confidence score for each of the plurality of semantic tags based at least in part on a number of times that each of the plurality of semantic tags has been associated with a respective location of the plurality of locations. The confidence score for each of the plurality of semantic tags can be associated with an accuracy (e.g., an extent to which a semantic tag correctly describes the state of a feature) of each of the plurality of semantic tags respectively. For example, the geographic computing system can access data associated with the number of times that a semantic tag associated with a feature has also been associated with geographic data corresponding to a location (e.g., latitude and longitude information). The geographic computing system can then generate a confidence score corresponding to the number of times the semantic tag associated with a feature has also been associated with geographic data corresponding to a location.

Further, the geographic computing system can determine that the confidence score for each semantic tag of the plurality of semantic tags satisfies one or more confidence criteria. For example, the geographic computing system can determine that a semantic tag with a confidence score below a confidence score threshold is not included in the determination of the one or more meeting locations.

In some embodiments, the geographic computing system identifying the plurality of tags that satisfy the one or more meeting criteria can include determining that the confidence score for each of the plurality of semantic tags satisfies one or more confidence criteria.

In some embodiments, the confidence score for each respective semantic tag of the plurality of semantic tags can be negatively correlated with an age of the semantic tag. For example, the geographic computing system can access data associated with the time at which each of the plurality of semantic tags was generated and determine that the confidence score for a semantic tag is lowered by an amount that increases in proportion to the age of the semantic tag.

In some embodiments, the geographic computing system can determine that each semantic tag of the plurality of semantic tags that corresponds to one or more key words (e.g., matches or includes one or more similar characteristics) satisfies the one or more meeting criteria. For example, the geographic computing system can determine that the one or more meeting criteria are satisfied when the semantic tags are associated with one or more key words including "restaurant", "bus stop", and/or "fountain". Further, a semantic tag corresponding to a key word can include exact correspondence (e.g., a "fountain" semantic tag matching the key word "fountain") as well as partial matches (e.g., "Fountains of Bellagio" can correspond to the key word "fountain").

In some embodiments, the geographic computing system identifying the plurality of semantic tags that satisfy the one or more meeting criteria can include determining that the one or more meeting criteria are satisfied when each semantic tag of the plurality of semantic tags that corresponds to the one or more key words satisfies the one or more meeting criteria.

In some embodiments, the one or more key words can be associated with one or more features that are visually prominent (e.g., large and/or bright features d) and/or one or more features that occur at a rate below a keyword rate threshold (e.g., uncommon features).

In some embodiments, the geographic computing system can determine a number of the plurality of semantic tags that corresponds to one or more key words. For example, the geographic computing system can compare information in each of the plurality of semantic tags to one or more key words in order to determine when a semantic tag corresponds to a key word. Further, the geographic computing system can increment a key word counter by one each time a semantic tag corresponds to a key word. In this way the geographic computing system can keep count of the number of semantic tags that correspond to the one or more key words.

In some embodiments, the geographic computing system can determine that the one or more meeting criteria are satisfied when the number of the plurality of semantic tags that corresponds to the one or more key words exceeds a key word threshold. For example, the geographic computing system can determine that the one or more meeting criteria are satisfied when three or more of the semantic tags correspond to the one or more key words.

In some embodiments, the geographic computing system determining the one or more meeting locations can include determining that the one or more meeting criteria are satisfied when the number of the plurality of semantic tags that corresponds to the one or more key words exceeds a key word threshold.

In some embodiments, the geographic computing system can determine a respective visibility associated with each semantic tag of the plurality of semantic tags. For example, a semantic tag can include information indicating that a location is in an area with a large number of street lamps which can improve the visibility of a location at night.

Further, the geographic computing system can determine that the respective visibility associated with each semantic tag of the plurality of semantic tags satisfies one or more visibility criteria. For example, the geographic computing system can determine that a visibility criterion is satisfied when a location includes at least one street light and/or is within a predetermined distance of a street light.

In some embodiments, the geographic computing system identifying the plurality of semantic tags that satisfy the one or more meeting criteria can include determining that the respective visibility associated with each semantic tag of the plurality of semantic tags satisfies one or more visibility criteria.

In some embodiments, determining that the visibility of the one or more meeting locations satisfies one or more visibility criteria can include determining that an amount of light (e.g., an amount of light in lux) at the one or more meeting locations exceeds a light threshold, determining that a size (e.g., physical dimensions) of the one or more features associated with the one or more meeting locations exceeds a size threshold, determining that a number of the plurality of locations from which a meeting location of the one or more meeting locations is visible exceeds a location visibility threshold, or determining that a number of the plurality of locations visible from a meeting location of the one or more meeting locations exceeds a vantage location visibility threshold.

In some embodiments, the geographic computing system can determine a location familiarity score of each location of the plurality of locations based at least in part on a number of times the carrier and/or the passenger have previously been within a predetermined distance of each location of the plurality of locations. Further, the determination of the number of times the carrier and/or passenger have previously been within a predetermined distance of each location can be based on information that has been voluntarily provided by the carrier and/or passenger respectively. For example, the carrier and/or the passenger can receive a clear request (e.g., "May information about the locations or areas that you visit or travel past be collected for future use?") asking the carrier and/or passenger for express permission to use information about the locations that the carrier and/or passenger have visited, travelled past, and/or been within a predetermined distance of. Additionally, any data and/or information associated with the locations visited by the carrier and/or passenger can be modified before being stored or used, so that personally identifiable information is removed. Further, stored information can be encrypted to secure it against unauthorized access.

By way of example, the location familiarity score can increase each time a carrier and/or passenger have previously been within twenty meters of a location.

Further, the geographic computing system can determine that the location familiarity score of the one or more meeting locations satisfies one or more location familiarity criteria. For example, the geographic computing system can determine that the one or more location familiarity criteria are satisfied when the location familiarity score exceeds a location familiarity score threshold.

In some embodiments, the geographic computing system determining the one or more meeting locations can include determining that the location familiarity score of the one or more meeting locations satisfies one or more location familiarity criteria.

In some embodiments, the geographic computing system can determine that the location data and/or the plurality of semantic tags satisfy one or more safety criteria. For example, the geographic computing system can determine that the location data indicates that the one or more meeting locations are not in a construction zone, in the middle of a highway, or at the edge of a cliff. Further, the geographic computing system can determine that the plurality of semantic tags do not include any semantic tags that are associated with potentially unsafe conditions including falling rocks, wildlife, and/or heavy machinery.

In some embodiments, the geographic computing system can determine one or more paths from the location of the carrier and/or the passenger to the one or more meeting locations. For example, the geographic computing system can access map information in the location data to determine one or more paths from the current location of the passenger to a location via one or more streets.

Further, the geographic computing system can determine that the one or more meeting locations are associated with at least one path of the one or more paths that satisfies one or more safety criteria (e.g., safety criteria that can be associated with the safety of the passenger and/or the carrier travelling to the one or more meeting locations). For example, the geographic computing system can determine that the one or more meeting locations is associated with (e.g., connected to and accessed by) a path with less than one road crossing per kilometer.

In some embodiments, the geographic computing system can determine at least one path from the location of the passenger and/or the carrier to the at least one meeting location that satisfies one or more path criteria associated with distance, complexity, and/or traffic. For example, the geographic computing system can determine at least one path from the location of the passenger to the at least one meeting location that satisfies a path criterion associated with a maximum distance of a path (e.g., the at least one meeting location is closer to the starting location of the passenger than the maximum distance). By way of further example, the geographic computing system can determine at least one path from the location of the passenger to the at least one meeting location that satisfies path criteria associated with a complexity of a path (e.g., the path to the at least one meeting location has less than a threshold number of turns and does not depart from major roads). By way of further example, the geographic computing system can determine at least one path from the location of the passenger to the at least one meeting location that satisfies a traffic criterion associated with an amount of traffic along a path (e.g., the path to the at least one meeting location along which the carrier and/or the passenger will encounter traffic that is less than a threshold traffic amount).

In some embodiments, the geographic computing system can determine the one or more meeting locations based at least in part on determining at least one path from the location of the passenger and/or the carrier to the at least one meeting location that satisfies one or more path criteria associated with distance, complexity, and/or safety of a path.

In some embodiments, the geographic computing system can determine that the one or more meeting locations are based at least in part on determining the one or more meeting locations associated with at least one path of the one or more paths that satisfies one or more safety criteria.

In some embodiments, satisfying the one or more safety criteria can include a rate of road crossings on the at least one path not exceeding a threshold rate of road crossings, an amount of light along the at least one path exceeding a threshold amount of light (e.g., the amount of light along the path can be determined based at least in part on the time of day and/or the amount of street lights along the path), a portion of the at least one path that includes a sidewalk, and/or the at least one path not crossing a hazard (e.g., a construction arca).

In some embodiments, the geographic computing system can determine one or more distances from the location of the carrier and/or the passenger to the one or more meeting locations. For example, the geographic computing system can access map information in the location data to determine one or more distances (e.g., distances in kilometers) from the current location of the passenger to each of the one or more meeting locations.

Further, the geographic computing system can determine that the distance from the location of the passenger and/or carrier to any of the one or more meeting locations is less than a distance threshold. For example, the geographic computing system can determine that the distance to any of the one or more meeting locations is less than an initial distance between the location of the carrier and the location of the passenger and/or a distance threshold based at least in part on the initial distance between the carrier and the passenger (e.g., the one or more meeting locations are not further away from either the carrier or the passenger than seventy-five percent of the initial distance between the carrier and the passenger).

In some embodiments, the geographic computing system can determine that the one or more meeting locations are based at least in part on determining that the distance from the location of the passenger to any of the one or more meeting locations is less than a distance threshold.

In some embodiments, the geographic computing system can determine that the one or more meeting criteria are satisfied when a distance from which each location of the one or more meeting locations is accessible to the carrier and/or the passenger is less than an accessibility distance threshold. For example, the geographic computing system can access the location data to determine a distance (e.g., a distance in meters) around a location that a carrier (e.g., a driver in a vehicle constrained to driving on roads) and a passenger (e.g., a pedestrian) can access (e.g., a distance within which a car can drive and a pedestrian can walk). Further, the geographic computing system can determine that the distance from which each location of the one or more meeting locations is less than an accessibility distance. For example, the geographic computing system can deter-mine that a meeting location (e.g., a bus stop accessible next to a side walk and a road) is within a distance threshold of less than thirty meters.

In some embodiments, the geographic computing system can determine the one or more meeting locations can include determining that a distance from which each location of the one or more meeting locations is accessible to the carrier and the passenger is less than a distance threshold.

In some embodiments, the geographic computing system can determine an case of recognition score for each semantic tag of the plurality of semantic tags, wherein the case of recognition is associated with the one or more features that are visually prominent or the one or more features that occur at a rate below an occurrence rate threshold. For example, the geographic computing system can determine that the case of recognition score for a location with three visually prominent features (e.g., three Christmas trees with festive lights) will be higher than the case of recognition score of a location with one similarly decorated Christmas tree of the same size that is otherwise similar in appearance. By way of further example, the geographic computing system can determine that the case of recognition score for a location with a visually prominent feature (e.g., a large fountain with sculptures of horses) will be higher than the case of recognition score of a location that lacks a fountain and is otherwise similar in appearance.

Further, the geographic computing system can determine that the case of recognition score of each semantic tag of the plurality of semantic tags satisfies one or more case of recognition criteria. For example, the geographic computing system can determine that each semantic tag of the plurality of semantic tags has an case of recognition score that exceeds an case of recognition threshold.

In some embodiments, the geographic computing system identifying the plurality of semantic tags that satisfy the one or more meeting criteria can include determining that the case of recognition score of the one or more meeting locations satisfies one or more case of recognition criteria.

In some embodiments, the geographic computing system can determine an arrangement (e.g., a ranking and/or way of positioning the one or more meeting locations) of the one or more meeting locations based at least in part on the case of recognition score associated with each of the one or more meeting locations. For example, the geographic computing system can determine an arrangement of the one or more meeting locations in which the one or more meeting locations associated with higher ease of recognition scores are positioned higher on the vertical axis of a display than the one or more meeting locations with lower case of recognition scores.

Further, the geographic computing system can generate one or more indications including the one or more one or more meeting locations arranged based at least in part on the arrangement of the one or more meeting locations. For example, the geographic computing system can generate visual indications with the higher meeting locations associated with higher case of recognition scores displayed above the meeting locations associated with lower case of recognition scores.

Further, the geographic computing system can receive an input to select at least one meeting location of the one or more meeting locations for the carrier or the passenger. For example, the geographic computing system can include a touch screen display that can display the textual indications of the one or more meeting locations and receive a touch input from a passenger to select one of the meeting locations as the meeting location at which the passenger desires to meet the carrier.

The systems, methods, devices, apparatuses, and tangible non-transitory computer-readable media in the disclosed technology can provide a variety of technical effects and benefits including an improvement in meeting location determination for use in navigation and meeting coordination by individuals including a carrier and/or a passenger. In particular, the disclosed technology may assist the user (e.g. a carrier in a vehicle and/or a passenger on foot) in performing a technical task (e.g. driving a vehicle to a specified location and or using a computing device as a navigational aid to travel on foot to the specified location) by means of a continued and/or guided human-machine interaction process. It may also provide benefits including improvements in the resource usage efficiency, safety, and the performance of communications networks.

The disclosed technology can improve the efficiency of resource consumption (e.g., fuel and electrical energy) by providing more effective indications (e.g., directions to the meeting location that are more conveniently accessed and closer to a carrier (e.g., to minimize fuel consumption) and a passenger. For example, indications that direct carriers and passengers to convenient to reach meeting locations can result in fewer missed meetings and waiting on the part of either party, thereby reducing the associated excess usage of fuel or electrical energy caused by such missed meetings and waiting.

Additionally, the use of safety criteria to determine meeting locations can improve passenger safety by directing the passenger to areas that offer increased safety. For example, a meeting location that is in a well-lit area, accessible by sidewalks and not close to hazards will improve passenger safety. Further, meeting locations that are readily accessible to both carrier and passenger can reduce the incidence of potentially unsafe activity including a passenger walking into a road to meet a carrier.

Furthermore, the disclosed technology can improve the performance of communications network operation by more effectively determining a meeting location for a carrier and a passenger. The meeting location can be provided to more efficiently route traffic through a transportation network and avoid situations in which communications network bandwidth is wasted due to ineffective navigational directions (e.g., sending additional sets of instructions across the network when the preceding sets of instructions were not properly followed). As such, more effective provision of navigational instructions can result in a reduction in the number of navigational instructions sent through a communications network with a corresponding reduction in bandwidth utilization.

Accordingly, the disclosed technology may assist the driver of a vehicle to perform more efficiently/effectively the technical task of driving the vehicle to a specified location by means of a continued and/or guided human-machine interaction process. In addition, the disclosed technology may provide a computing system that facilitates more effective identification of a meeting location for use in navigation, geocoding, and transportation. The disclosed technology provides the specific benefits of reduced network bandwidth utilization, more efficient fuel and energy usage, and increased safety, any of which can be used to improve the effectiveness of a wide variety of services including navigation services and meeting coordination services.

With reference now to FIGS. 1-14, example embodiments of the present disclosure will be discussed in further detail.

FIG. 1 depicts a diagram of an example system according to example embodiments of the present disclosure. The system 100 includes a computing device 102, a server computing system 130, a training computing system 150, and one or more remote computing systems 170 that are communicatively connected and/or coupled over a network 180.

The computing device 102 can include any type of computing device, including, for example, a personal computing device (e.g., laptop computing device or desktop computing device), a mobile computing device (e.g., smartphone or tablet), a gaming console, a controller, a wearable computing device (e.g., a smart watch), an embedded computing device, and/or any other type of computing device.

The computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, including RAM, ROM, EEPROM, EPROM, flash memory devices, magnetic disks, and combinations thereof. The memory 114 can store data 116 and instructions 118 which are executed by the processor 112 to cause the computing device 102 to perform operations.

In some embodiments, the computing device 102 can perform one or more operations including accessing location data and/or a plurality of semantic tags. The location data can include information associated with a plurality of locations including a location of a carrier and/or a location of a passenger. The plurality of semantic tags can include information associated with one or more features of the plurality of locations. The operations performed by the computing device 102 can also include identifying the location data and the plurality of semantic tags that satisfy one or more meeting criteria associated with a suitability of a location for the carrier and the passenger. The operations performed by the computing device 102 can include determining one or more meeting locations for the carrier and the passenger based at least in part on the location data and the plurality of semantic tags that satisfy the one or more meeting criteria. Furthermore, the operations performed by the computing device 102 can include generating one or more indications associated with at least one meeting location of the one or more meeting locations based at least in part on the one or more features of the at least one meeting location of the one or more meeting locations.

In some implementations, the computing device 102 can store or include one or more machine-learned models 120. For example, the one or more machine-learned models 120 can include various machine-learned models including neural networks (e.g., deep neural networks) or other types of machine-learned models, including non-linear models and/ or linear models. Neural networks can include feed-forward neural networks, recurrent neural networks (e.g., long short-term memory recurrent neural networks), convolutional neural networks or other forms of neural networks. Examples of the one or more machine-learned models 120 are discussed with reference to FIGS. 1-14.

In some implementations, the one or more machine-learned models 120 can be received from the server computing system 130 over network 180, stored in the computing device memory 114, and then used or otherwise implemented by the one or more processors 112. In some implementations, the computing device 102 can implement multiple parallel instances of a single machine-learned model of the one or more machine learned models 120 (e.g., to perform parallel meeting location determination for a carrier and a passenger across multiple instances of the machine-learned model 120). More particularly, the one or more machine-learned models 120 can determine and/or identify meeting locations for use by a carrier and/or a passenger based in part on various inputs including location data and/or semantic tags (e.g., semantic tags associated with one or more features of a location). Further, the one or more machine learned models 120 can determine one or more indications to provide in association with meeting locations that are identified.

Additionally or alternatively, one or more machine-learned models 140 can be included in or otherwise stored and implemented by the server computing system 130 that communicates with the computing device 102 according to a client-server relationship. For example, the machine-learned models 140 can be implemented by the server computing system 140 as a portion of a web service (e.g., a suitable meeting location determination service). Thus, one or more machine-learned models 120 can be stored and implemented at the computing device 102 and/or one or more machine-learned models 140 can be stored and implemented at the server computing system 130.

The computing device 102 can also include one or more of the user input component 122 that can receive user input. For example, the user input component 122 can be a touch-sensitive component (e.g., a touch-sensitive display screen or a touch pad) that is sensitive to the touch of a user input (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can include any suitable processing device (e.g., a processor core, a microprocessor, an ASIC, a FPGA, a controller, a microcontroller, etc.) and can include one processor or a plurality of processors that are operatively connected. The memory 134 can include one or more non-transitory computer-readable storage mediums, including RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some embodiments, the server computing system 130 can perform one or more operations including accessing location data and/or a plurality of semantic tags. The location data can include information associated with a plurality of locations including a location of a carrier and/or a location of a passenger. The plurality of semantic tags can include information associated with one or more features of the plurality of locations. The operations performed by the server computing system 130 can also include identifying the location data and the plurality of semantic tags that satisfy one or more meeting criteria associated with a suitability of a location for the carrier and the passenger. The operations performed by the server computing system 130 can include determining one or more meeting locations for the carrier and the passenger based at least in part on the location data and the plurality of semantic tags that satisfy the one or more meeting criteria. Furthermore, the operations performed by the server computing system 130 can include generating one or more indications associated with at least one meeting location of the one or more meeting locations based at least in part on the one or more features of the at least one meeting location of the one or more meeting locations.

Furthermore, the server computing system 130 can perform image content analysis on one or more inputs (e.g., one or more images) that are provided to the server computing system 130. For example, the server computing system 130 can receive data, via the network 180, including location data and/or associated semantic tags. The server computing system 130 can then perform various operations, which can include the use of the one or more machine-learned models 140, to detect one or more features of the one or more images and/or to associated semantic tags with images. By way of further example, the server computing system 130 can use object recognition techniques to detect one or more objects in an image (e.g., detecting pedestrians, vehicles, various buildings, fountains, street signs, and road markings) and generate semantic information based on recognition of the objects. In another example, the server computing system 130 can receive data from one or more remote computing systems (e.g., the one or more remote computing systems 170) which can include images that have been associated with semantic tags (e.g., images with manual user associated semantic tags and/or images with semantic tags generated by a user device). The data received by the server computing system 130 can then be stored (e.g., stored in an image repository) for later use by the computing system 130.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the one or more machine-learned models 140 can include various machine-learned models. Example machine-learned models include neural networks or other multi-layer non-linear models. Example neural networks include feed forward neural networks, deep neural networks, recurrent neural networks, and convolutional neural networks. Examples of the one or more machine-learned models 140 are discussed with reference to FIGS. 1-14.

The computing device 102 and/or the server computing system 130 can train the one or more machine-learned models 120 and/or 140 via interaction with the training computing system 150 that is communicatively connected and/or coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, including RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned one or more machine-learned models 120 and/or the one or more machine-learned models 140 respectively stored at the computing device 102 and/or the server computing system 130 using various training or learning techniques, including, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the one or more machine-learned models 120 and/or the one or more machine-learned models 140 based on a set of training data 162. The training data 162 can include, for example, location data (e.g., data including information associated with pedestrian and vehicle interactions in a location), semantic data (e.g., semantic tags) describing the location and/or one or more features in an area. For example, the training data can include physical dimensions associated with a feature, the proximity of a feature to one or more points of reference (e.g., other locations), the location of a feature (e.g., latitude, longitude, and/or altitude of a feature), and/or various metadata associated with the feature (e.g., a nickname for a feature, a former name of a feature, and/or alternate spellings of a feature).

In some implementations, if the user has provided consent, the training examples can be provided by the computing device 102. Thus, in such implementations, the one or more machine-learned models 120 provided to the computing device 102 can be trained by the training computing system 150 on user-specific data received from the computing device 102. In some instances, this process can be referred to as personalizing the model.

The model trainer 160 can include computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium including RAM hard disk or optical or magnetic media.

In some embodiments, the training computing system 150 can perform one or more operations including accessing location data and/or a plurality of semantic tags. The location data can include information associated with a plurality of locations including a location of a carrier and/or a location of a passenger. The plurality of semantic tags can include information associated with one or more features of the plurality of locations. The operations performed by the training computing system 150 can also include identifying the location data and the plurality of semantic tags that satisfy one or more meeting criteria associated with a suitability of a location for the carrier and the passenger. The operations performed by the training computing system 150 can include determining one or more meeting locations for the carrier and the passenger based at least in part on the location data and the plurality of semantic tags that satisfy the one or more meeting criteria. Furthermore, the operations performed by the training computing system 150 can include generating one or more indications associated with at least one meeting location of the one or more meeting locations based at least in part on the one or more features of the at least one meeting location of the one or more meeting locations.

Each of the one or more remote computing systems 170 includes one or more processors 172 and a memory 174. The one or more processors 172 can include any suitable processing device (e.g., a processor core, a microprocessor, an ASIC, a FPGA, a controller, a microcontroller, etc.) and can include one processor or a plurality of processors that are operatively connected. The memory 174 can include one or more non-transitory computer-readable storage mediums, including RAM, ROM, EEPROM, EPROM, flash memory devices, magnetic disks, etc., and combinations thereof. The memory 174 can store data 176 and instructions 178 which are executed by the processor 172 to cause the server computing system 170 to perform operations.

In some implementations, the one or more remote computing systems 170 includes or is otherwise implemented by one or more computing devices. In instances in which the one or more remote computing systems 170 includes plural computing devices, such computing devices can operate according to sequential computing architectures, parallel computing architectures, and/or some combination thereof. Furthermore, the one or more remote computing systems 170 can be used to collect, generate, send, and or receive one or more signals and/or data including location data and/or one or more semantic tags that can be associated with one or more locations and/or one or more features of the one or more locations. The one or more remote computing systems 170 can include a smart phone device that a user of the smart phone device can use to generate location data and/or a semantic tag associated with one or more images captured by a camera of the smart phone device. For example, the user of the smart phone device can capture an image of a location (e.g., a restaurant) that includes a latitude and longitude of the location as well as geolocation information embedded in the image. The user can then manually annotate the image with a semantic tag that includes a description of the location (e.g., how crowded the location is at a particular time of day) which is then sent to the server computing system 170 which includes an image repository. The manually annotated image can be strongly encrypted, anonymized (e.g., any personal information associated with the image is either not collected or is deleted after being received), and maintained in a privacy enhancing way for use by the server computing system 170 which can provide the image and the associated location data and/or semantic tag for use an image content analysis portion of the server computing system 170 and/or the training computing system 150.

The network 180 can include any type of communications network, including a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations, the computing device 102 can include the model trainer 160 and the training dataset 162. In such implementations, the one or more machine-learned models 120 can be both trained and used locally at the computing device 102. In some of such implementations, the computing device 102 can implement the model trainer 160 to personalize the one or more machine-learned models 120 based on user-specific data.

FIG. 2 depicts a diagram of an example device according to example embodiments of the present disclosure. A computing device 200 can include one or more features of the computing device 102, the server computing system 130, and/or the training computing system 150. Furthermore, the computing device 200 can perform one or more actions and/or operations including the one or more actions and/or operations performed by the computing device 102, the server computing system 130, and/or the training computing system 150, which are depicted in FIG. 1.

As shown in FIG. 2, the computing device 200 can include one or more memory devices 202, location data 204, semantic tag data 206, one or more interconnects 232, one or more processors 220, a network interface 222, one or more mass storage devices 224, one or more output devices 226, a sensor array 228, and one or more input devices 230.

The one or more memory devices 202 can store information and/or data (e.g., the location data 204 and/or the semantic tag data 206) including information associated with the processing of one or more instructions that are used to perform one or more actions and/or operations including accessing location data and/or semantic tags; identifying location data and/or semantic tags that satisfy meeting criteria; determining meeting locations for a carrier and a passenger based on the location data and/or semantic tags that satisfy the meeting criteria; and/or generating indications based on features of the meeting locations.

The location data 204 can include one or more portions of the data 116, the data 136, and/or the data 156 which are depicted in FIG. 1. Furthermore, the location data 204 can include information associated with locations including the location of a carrier and/or the location of a carrier, one or more maps, one or more semantic tags (e.g., semantic tags embedded in the one or more maps which can include one or more semantic tags in the semantic tag data 206), sensor outputs, and/or machine-learned models.

Figure 8:
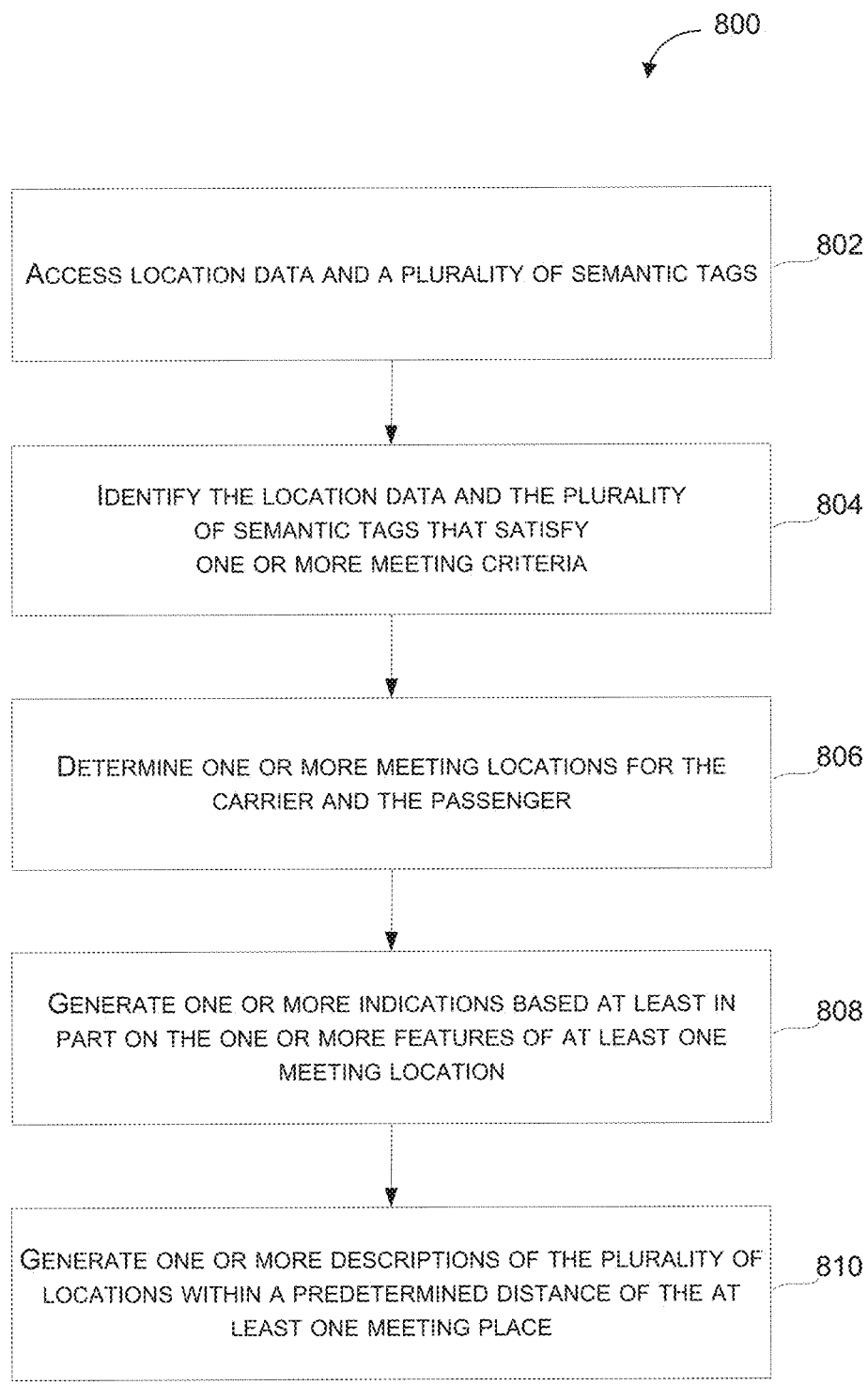
FIG. 8 depicts a flow diagram of an example method for determining a meeting location in an environment according to example embodiments of the present disclosure.

The semantic tag data 206 can include one or more portions of the data 116, the data 136, and/or the data 156 which are depicted in FIG. 1. Furthermore, the semantic tag data 206 can include information associated with one or more semantic tags including semantic tags used to describe one or more features of images (e.g., images retrieved from image databases) and/or one or more maps (e.g., one or more maps in the location data 204). Furthermore, the semantic tag data can include a plurality of semantic tags which can include one or more features of the plurality of semantic tags described in the method 800 that is depicted in FIG. 8.

The one or more interconnects 210 can include one or more interconnects or buses that can be used to send and/or receive one or more signals (e.g., electronic signals) and/or data (e.g., the location data 204 and/or the semantic tag data 206) between components of the computing device 200, including the one or more memory devices 202, the one or more processors 220, the network interface 222, the one or more mass storage devices 224, the one or more output devices 226, the sensor array 228, and/or the one or more input devices 230. The one or more interconnects 210 can be arranged or configured in different ways including as parallel or serial connections. Further the one or more interconnects 210 can include one or more internal buses to connect the internal components of the computing device 200; and one or more external buses used to connect the internal components of the computing device 200 to one or more external devices. By way of example, the one or more interconnects 210 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (Fire Wire), and/or other interfaces used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the location data 204 and/or the semantic tag data 206. For example, the one or more processors 220 can include single or multiple core devices including a microprocessor, microcontroller, integrated circuit, and/or logic device.

The network interface 222 can support network communications. For example, the network interface 222 can support communication via networks including a local area network and/or a wide area network (e.g., the Internet). The one or more mass storage devices 224 (e.g., a hard disk drive and/or a solid state drive) can be used to store data including the location data 204 and/or the semantic tag data 206. The one or more output devices 226 can include one or more display devices (e.g., LCD display, OLED display, and/or CRT display), one or more light sources (e.g., LEDs), one or more loud speakers, and/or one or more haptic output devices.

The one or more input devices 230 can include one or more keyboards, one or more touch sensitive devices (e.g., a touch screen display), one or more buttons (e.g., ON/OFF buttons, YES/NO buttons), one or more control sticks (e.g., joysticks), one or more microphones, and/or one or more cameras (e.g., cameras that can be used for the detection of gestures and/or facial expressions).

The one or more memory devices 202 and the one or more mass storage devices 224 are illustrated separately, however, the one or more memory devices 202 and the one or more mass storage devices 224 can be regions within the same memory module. The computing device 200 can include one or more additional processors, memory devices, network interfaces, which may be provided separately or on a same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. The one or more memory devices 202 can be used to operate various applications including a mobile operating system developed specifically for mobile devices. As such, the one or more memory devices 202 can store instructions that allow the software applications to access data including wireless network parameters (e.g., identity of the wireless network, quality of service), and invoke various services including telephony, location determination (e.g., via global positioning service (GPS) or WLAN), and/or wireless network data call origination services. In other embodiments, the one or more memory devices 202 can be used to operate or execute a general-purpose operating system that operates on both mobile and stationary devices (e.g., smartphones, laptop computers, tablet computers, and/or desktop computers).

The software applications that can be operated or executed by the computing device 200 can include applications associate with the system 100 shown in FIG. 1. Further, the software applications that can be operated or executed by the computing device 200 can include native applications and/or web-based applications.

In some embodiments, the computing device 200 can be associated with or include a positioning system (not shown). The positioning system can include one or more devices or circuitry for determining the position of the computing device 200. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position.

Figure 3:
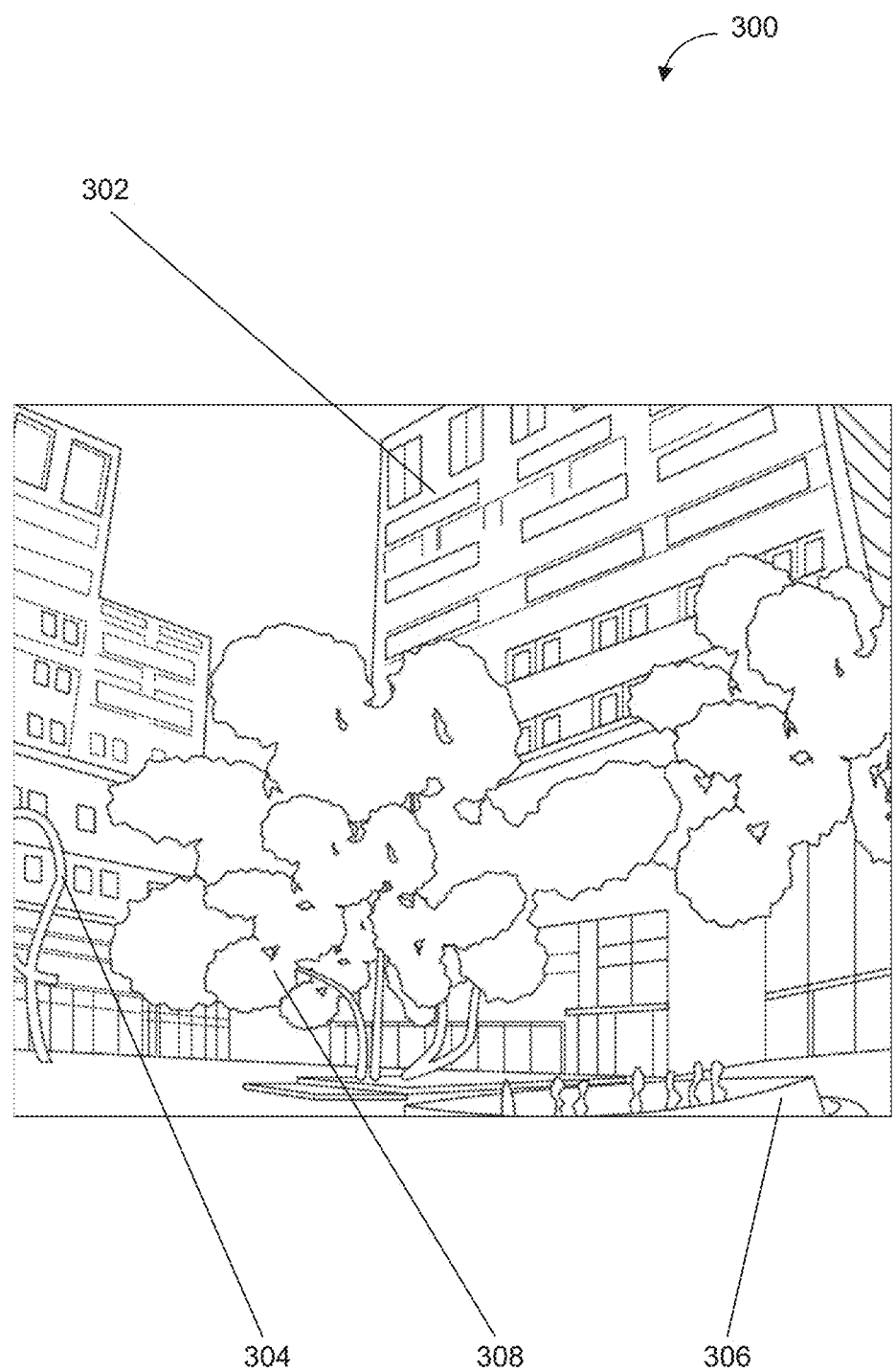
FIG. 3 depicts an example of determining a meeting location according to example embodiments of the present disclosure.

FIG. 3 depicts an example of determining a meeting location according to example embodiments of the present disclosure. The output illustrated in FIG. 3 can be generated and/or determined by a computing system or computing device that includes one or more features of the computing device 102, the server computing system 130, and/or the training computing system 150, which are depicted in FIG. 1. As shown in FIG. 3, the image 300 includes a building feature 302, a sculpture feature 304, a fountain feature 306, and a tree feature 308.

The image 300 depicts a location with one or more features including one or more features associated with various objects in the environment depicted in the image 300 that have been identified by a computing system (e.g., a content analysis system including one or more machine learned models trained to detect one or more features of input content which can include or more images).

For example, the computing system can include one or more aspects of the computing device 102, the server computing system 130, and/or the training computing system 150. Further, the one or more features of the image 300, including the building feature 302, the sculpture feature 304, the fountain feature 306, and the tree feature 308 can be associated with various semantic tags (e.g., semantic tags that include one or more features of the plurality of semantic tags described in the method 800 that is depicted in FIG. 8) that can include descriptions of various aspects of the one or more features. For example, the one or more features of the image 300 can be associated with one or more of a plurality of semantic tags based on image content analysis performed by one or more machine-learned models that include one or more aspects of the one or more machine-learned models 120 that are depicted in FIG. 1. Furthermore, the image 300 can be associated with location data (e.g., metadata included in the image 300) that can include a location (e.g. latitude, longitude, and/or altitude) that is associated with the image 300, features depicted in the image 300 (e.g., the fountain feature 306), and/or the vantage point from which the image 300 was captured.

In this example, the building feature 302 is in the background with respect to other features of the image 300 (e.g., the sculpture feature 304 and the fountain feature 306) and, from the perspective of the image 302, is partially obstructed by objects including the tree represented by the tree feature 308. Further, the building feature 302 can generate its own light (e.g., external lights of the building feature 302 and/or light emanating from internal portions of the building feature 302 that are visible through windows of the building 302) which may increase the visibility of a location associated with the building feature 302. The large size of the building feature 302 exceeds a size threshold (e.g., a height threshold and/or footprint threshold) which may increase the prominence (e.g., visual prominence) of the location associated with the building feature 302. The increased prominence of the building feature 302 may also result in increased case of recognition (e.g., the case with which a feature and/or a location associated with the feature can be recognized by a computing system and/or person including a carrier or a passenger) of the building feature 302. With respect to distinctiveness, the building feature 302 can be determined (e.g., determined based on a determination of the rate of occurrence of the feature by the computing device 102 that is depicted in FIG. 1) to be the type of feature that occurs frequently (e.g., there are many buildings throughout the city in which the image 300 was captured including other similar looking buildings that are present in the image 300) and that the building feature 302 has low distinctiveness (e.g., the various buildings throughout the area in which the image 300 was captured have a similar size, shape, color, and appearance). The low distinctiveness of the building feature 302 may result in a lower case of recognition of the building feature 302.

As such, based in part on visibility, prominence, distinctiveness, and case of recognition, the building feature 302 may be a type of feature that is less likely to be used as a meeting location than other locations that include features that are more visible, prominent, distinctive, and/or more easily recognized.

The sculpture feature 304 is in the foreground with respect to other features of the image 300 (e.g., the building feature 302 and the fountain feature 306) which can result in increased visibility of the sculpture feature 304. The sculpture feature 304 is not illuminated by external lighting devices and cannot generate its own light which may result in decreased visibility of the sculpture feature 304 under certain conditions (e.g., at night, and in fog, rain, snow, and/or hail) and thereby may result in decreased visibility of the location associated with the sculpture feature 304. The size of the sculpture feature 302 exceeds a size threshold (e.g., a height threshold and/or volume threshold) which may result in an increased prominence of the sculpture feature 304. Further, the prominence of the sculpture feature 304 may result in an increased case of recognition of the sculpture feature 304. With respect to distinctiveness, the sculpture feature 304 can be determined to be the type of feature that occurs infrequently (e.g., there are no other similar looking sculptures within a predetermined distance of the sculpture feature 304). Furthermore, the unusual shape of the sculpture feature 304 increases the distinctiveness of the sculpture feature 304. The increased distinctiveness of the sculpture feature 304 may result in a higher case of recognition of the sculpture feature 304.

As such, based in part on visibility, visual prominence, distinctiveness, and case of recognition, the sculpture feature 304 may be a type of feature that is more likely to be used as a meeting location than other locations with less visible, prominent, distinctive, and/or easily recognized features.

The fountain feature 306 is not obstructed by other objects depicted in the image 300 which can result in the fountain feature having increased visibility. Further, the fountain feature 306 is illuminated by lighting devices inside the fountain feature 306 (not shown) and can generate its own light which may increase the visibility of the fountain feature 306 under certain conditions (e.g., at night, and in fog, rain, snow, and/or hail) and thereby increase the visibility of the location depicted in the image 300. The size of the fountain feature 306 does not exceed a size threshold (e.g., a height threshold) which may decrease the prominence of the location depicted in the image 300 due to the relatively low height of the fountain feature 306. However, the fountain feature 306 has an increased prominence due to its water spouts whose movements can capture the attention of people including the carrier and/or the passenger. The increased prominence of the fountain feature 306 may result in an increased case of recognition of the fountain feature 306. With respect to distinctiveness, the fountain feature 306 can be determined (e.g., determined based on a determination of the rate of occurrence of the feature by the computing device 102 that is depicted in FIG. 1) to be the type of feature that occurs infrequently (e.g., there are not many other similar looking fountains within a predetermined distance of the fountain feature 306). The increased distinctiveness of the fountain feature 306 may result in a higher case of recognition of the fountain feature 306.

As such, based in part on visibility, prominence, distinctiveness, and ease of recognition, the fountain feature 306 may be a type of feature that is more likely to be used as a meeting location than other locations with less visible, prominent, distinctive, and/or easily recognized features.

The tree feature 308 is not obstructed by other objects which may also increase the visibility of the tree feature 308. Further, the tree feature 308 is not illuminated by external lighting devices which may decrease the visibility of the tree feature 308 under certain conditions (e.g., at night, and in fog, rain, snow, and/or hail) and thereby not increase the visibility of the location depicted in the image 300. The size of the tree feature 308 exceeds a size threshold (e.g., a height threshold) which may make the location depicted in the image 300 more prominent. However, the shape and coloring of the tree feature 308 may decrease the prominence of the tree feature 308. The decreased visual prominence of the tree feature 308 may result in a decreased ease of recognition (e.g., the case with which a feature can be recognized by a computing system and/or person including a carrier and/or passenger) of the tree feature 308. With respect to distinctiveness, the tree feature 308 can be determined (e.g., determined based on a determination of the rate of occurrence of the feature by the computing device 102 that is depicted in FIG. 1) to be the type of feature that occurs frequently (e.g., there many other trees in the area in which the image 300 was captured including other similar looking trees). The decreased distinctiveness of the tree feature 308 may result in a lower case of recognition of the tree feature 308.

As such, based in part on visibility, prominence, distinctiveness, and case of recognition, the tree feature 308 may be a type of feature that is less likely to be used as a meeting location than other locations with more visible, prominent, distinctive, and/or easily recognized features.

Figure 4:
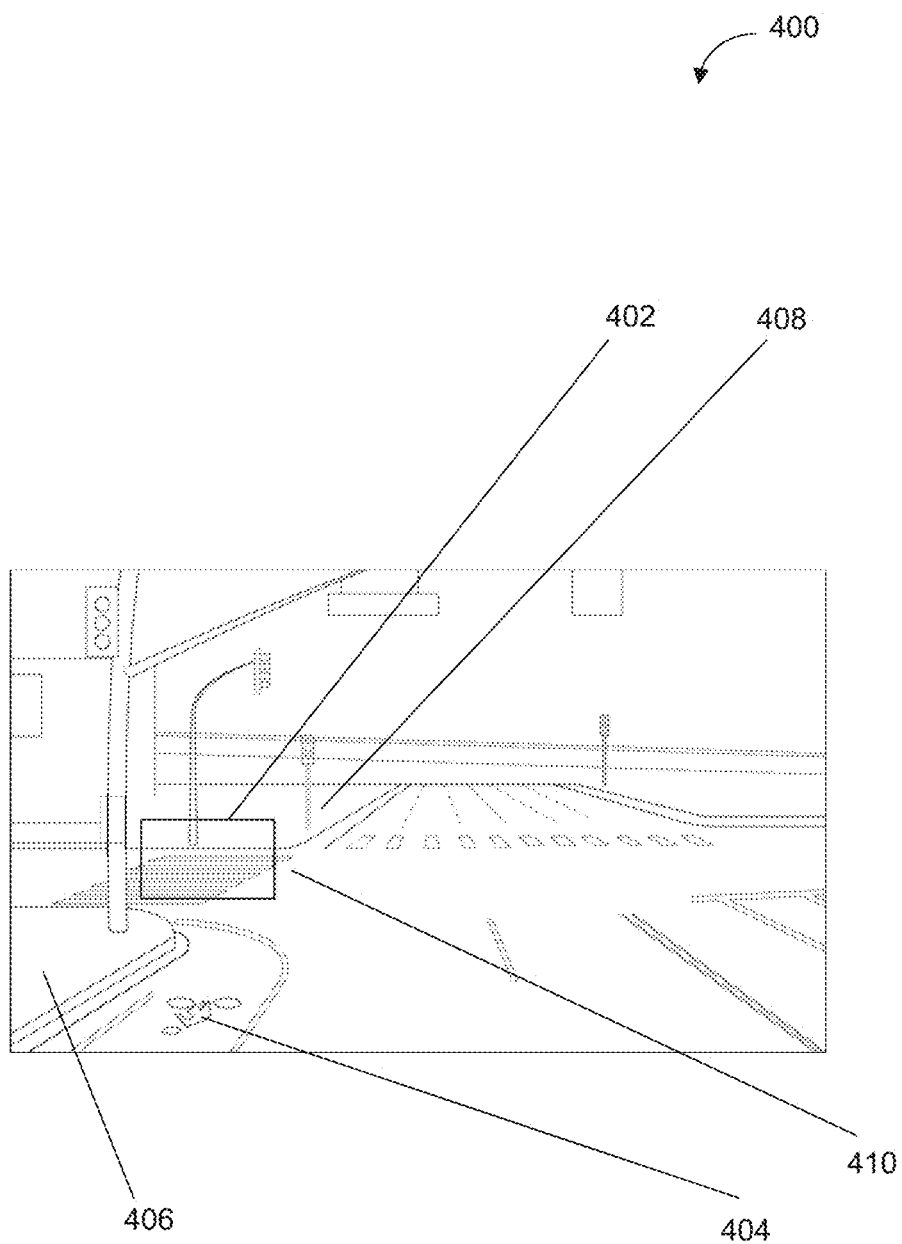
FIG. 4 depicts an example of determining a meeting location according to example embodiments of the present disclosure.

FIG. 4 depicts an example of determining a meeting location according to example embodiments of the present disclosure. The image illustrated in FIG. 4 can be generated and/or determined by a computing system or computing device that includes one or more features of the computing device 102, the server computing system 130, and/or the training computing system 150, which are depicted in FIG. 1. As shown in FIG. 4, the image 400 includes a crosswalk feature 402, a bicycle lane feature 404, a sidewalk feature 406, a sidewalk feature 408, and a street feature 410.

The image 400 depicts a location with one or more features including one or more features associated with various objects in the environment depicted in the image 400 that have been identified by a computing system (e.g., a content analysis system including one or more machine learned models trained to detect one or more features of input content which can include or more images).

For example, the computing system can include one or more aspects of the computing device 102, the server computing system 130, and/or the training computing system 150. Further, the one or more features of the image 400, including the feature 402, the bicycle lane feature 404, the sidewalk feature 406, the sidewalk feature 408, and the street feature 410 can be associated with various semantic tags (e.g., semantic tags that include one or more features of the plurality of semantic tags described in the method 800 that is depicted in FIG. 8) that can include descriptions of various aspects of the one or more features. For example, the one or more features of the image 400 can be associated with one or more of a plurality of semantic tags based on image content analysis performed by one or more machine-learned models (e.g., the one or more machine-learned models 120 that are depicted in FIG. 1). Furthermore, the image 400 can be associated with location data (e.g., metadata included in the image 400) that can include a location (e.g. latitude, longitude, and/or altitude) that is associated with the image 400, features depicted in the image 400 (e.g., the crosswalk feature 402), and/or the vantage point from which the image 400 was captured.

In this example, the crosswalk feature 402 represents a crosswalk between the sidewalk feature 406 (located on one side of a street represented by the street feature 410) and the sidewalk feature 408 (located opposite the sidewalk feature 406 on the other side of the street represented by the street feature 410). The crosswalk feature 402 represents an area in which the safety of pedestrians crossing a street is increased in comparison to other similar areas that lack the crosswalk feature 402. For example, the crosswalk feature 402 may increase the safety of a passenger travelling on foot and crossing the street represented by the street feature 410.

Furthermore, the bicycle lane feature 404 represents a bicycle lane on the street represented by the street feature 410. The presence of the bicycle lane feature 404 may increase the safety of an individual (e.g., a passenger cycling to a meeting location) as the individual travels to a meeting location. Accordingly, the presence of the bicycle lane feature 404 can increase the likelihood that a location associated with the bicycle lane feature 404 will be used as a meeting location.

Figure 5:
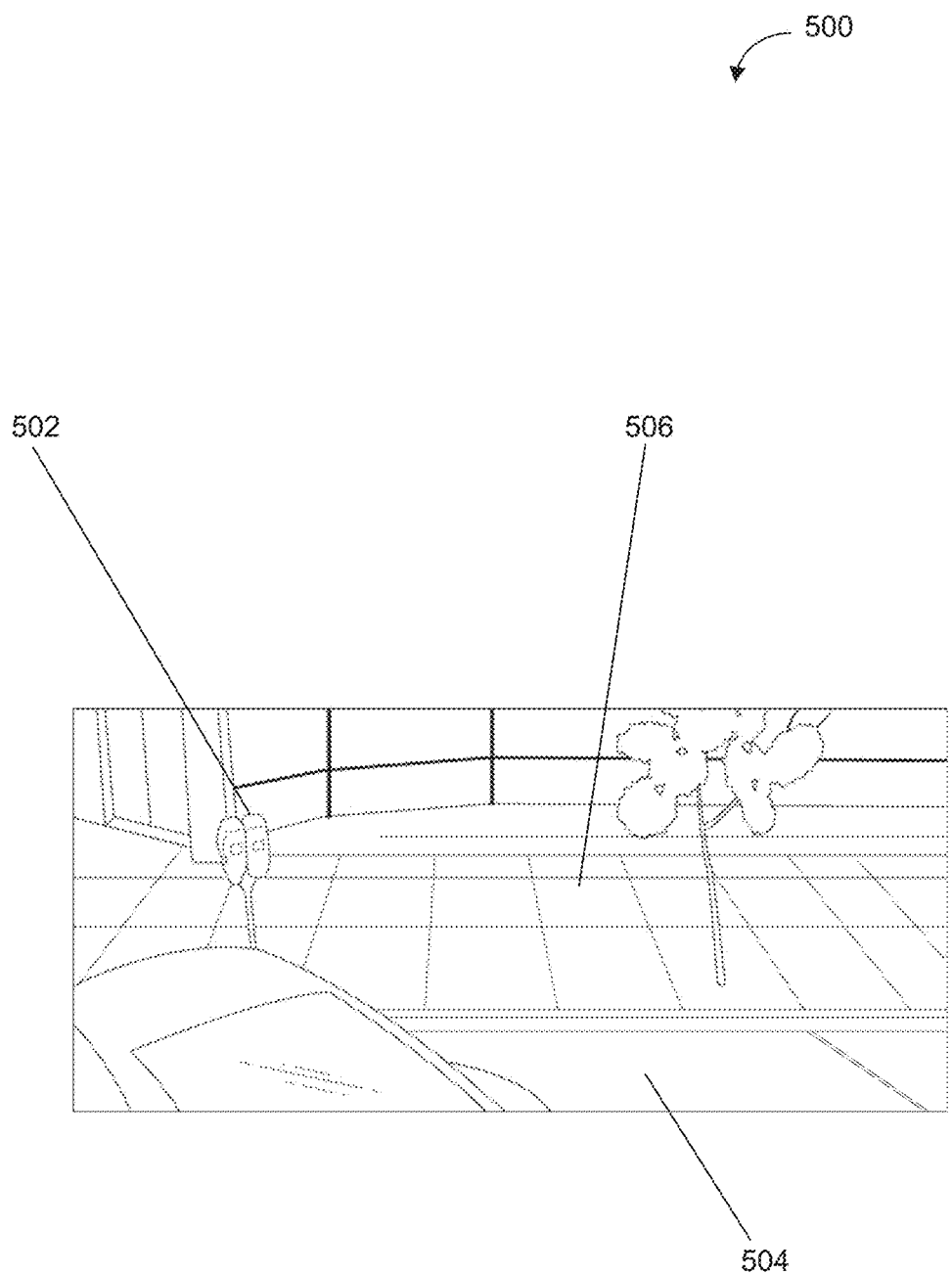
FIG. 5 depicts an example of determining a meeting location according to example embodiments of the present disclosure.

FIG. 5 depicts an example of determining a meeting location according to example embodiments of the present disclosure. The image illustrated in FIG. 5 can be generated and/or determined by a computing system or computing device that includes one or more features of the computing device 102, the server computing system 130, and/or the training computing system 150, which are depicted in FIG. 1. As shown in FIG. 5, the image 500 includes a parking meter feature 502, a parking space feature 504, and a sidewalk feature 506.

The image 500 depicts a location with one or more features including one or more features associated with various objects in the environment depicted in the image 500 that have been identified by a computing system (e.g., a content analysis system including one or more machine learned models trained to detect one or more features of input content which can include or more images, as described herein).

For example, the computing system can include one or more aspects of the computing device 102, the server computing system 130, and/or the training computing system 150. Further, the one or more features of the image 500, including the parking meter feature 502, the parking space feature 504, and the sidewalk feature 506, can be associated with various semantic tags (e.g., semantic tags that include one or more features of the plurality of semantic tags described in the method 800 that is depicted in FIG. 8) that can include descriptions of various aspects of the one or more features. For example, the one or more features of the image 500 can be associated with one or more of a plurality of semantic tags based on image content analysis performed by one or more machine-learned models (e.g., the one or more machine-learned models 120 that are depicted in FIG. 1). Furthermore, the image 500 can be associated with location data (e.g., metadata included in the image 500) that can include a location (e.g. latitude, longitude, and/or altitude) that is associated with the image 500, features depicted in the image 500 (e.g., the parking meter feature 502), and/or the vantage point from which the image 500 was captured.

In this example, the location indicated by the sidewalk feature 506 represents a sidewalk that is in close proximity (e.g., within a predetermined proximity distance threshold of ten meters) to the parking meter 502 and the parking space feature 504. The parking meter 502 and the parking space feature 504 can be identified as being associated with a location at which a vehicle (e.g., an automobile operated by a carrier) can park. Further, the sidewalk feature 506 can be identified as a location at which an individual (e.g., a passenger) can safely wait (e.g., wait for a carrier to pick the passenger up). The close proximity of the sidewalk feature 506 where a passenger can safely wait and the parking meter feature 502 and parking space feature 504 where a carrier can safely park can indicate that the accessibility (e.g., accessibility to the carrier and/or the passenger) of the location depicted in the image 500 is increased. Accordingly, the location depicted in the image 500 may be more likely to be determined to be suitable for use as a meeting location for a carrier and a passenger.

Figure 6:
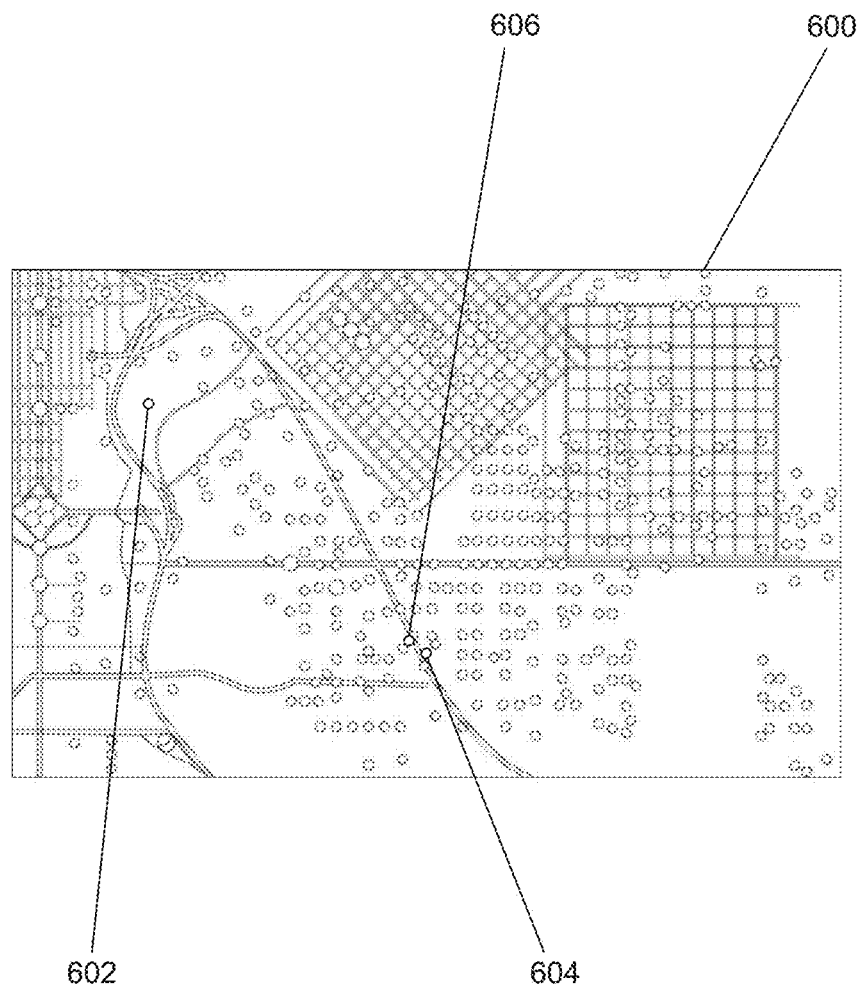
FIG. 6 depicts an example of determining a meeting location according to example embodiments of the present disclosure.

FIG. 6 depicts an example of determining a meeting location according to example embodiments of the present disclosure. The image illustrated in FIG. 6 can be generated and/or determined by a computing device or computing system that includes one or more features of the computing device 102, the server computing system 130, and/or the training computing system 150, which are depicted in FIG. 1. As shown in FIG. 6, the image 600 includes a carrier location 602, a passenger location 604, and a meeting location 606.

The image 600 depicts a map of an area (the city of Denver) including representations of locations associated with one or more semantic tags (e.g., one or more semantic tags that include one or more features of the plurality of semantic tags described in the method 800 that is depicted in FIG. 8) that are associated with a particular feature (e.g., the bicycle lane feature 404 that is depicted in FIG. 4). The feature indicated by the semantic tag (e.g. "bicycle lane" or "cycling lane") may be indicative of a feature that is within a predetermined distance of a location that is suitable for use as a meeting location (e.g., a meeting location for a carrier and a passenger). For example, a passenger can ride a bicycle to meet a carrier at a meeting location that is accessible by a bicycle lane. In determining a location that is suitable for use as a meeting location, the bicycle lane feature indicated by the bicycle lane semantic tag may positively influence the identification of a location as being suitable. Accordingly, all other things being equal, the meeting location 606 may be more likely to be identified as a meeting location than other areas that do not include the bicycle lane feature. For example, the computing device 102 depicted in FIG. 1 can select the meeting location 606 as a meeting location for a carrier located at the carrier location 602 and a passenger located at the passenger location 604.

Furthermore, the proximity of the meeting location 606 to the passenger location 604 can also increase the likelihood that the meeting location 606 will be determined to be the meeting location. For example, a passenger travelling on foot from the passenger location 604 may use a similar amount of time to travel to the meeting location 606 as a carrier travelling by vehicle (e.g., an automobile) to the meeting location 606. As such, depending on the means of travel used by a carrier or passenger, the distance to the meeting location may weigh in favor of greater proximity to the party (e.g., carrier or passenger) that uses the slower means of travel.

Figure 7:
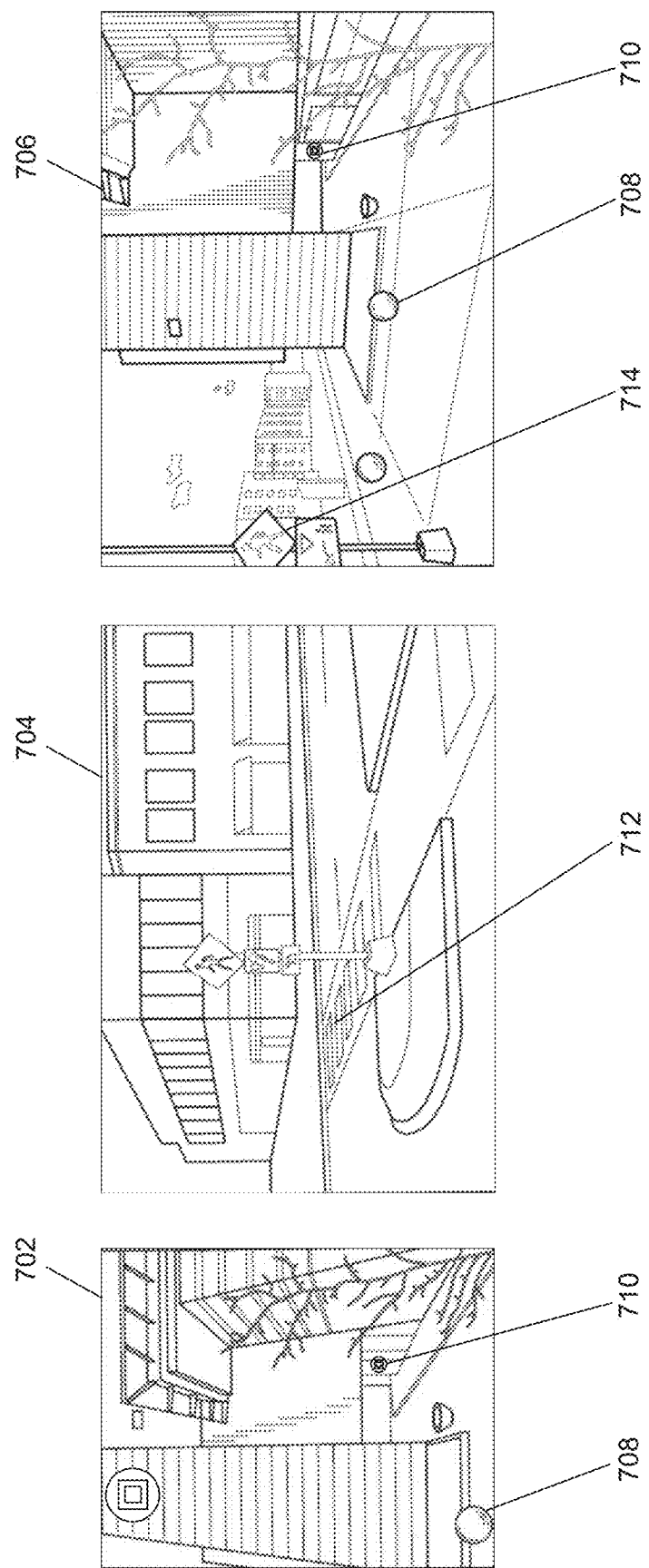
FIG. 7 depicts an example of determining a meeting location according to example embodiments of the present disclosure.

FIG. 7 depicts an example of determining a meeting location according to example embodiments of the present disclosure. The output illustrated in FIG. 7 can be generated and/or determined by a computing system or computing device that includes one or more features of the computing device 102, the server computing system 130, and/or the training computing system 150, which are depicted in FIG. 1. As shown, FIG. 7 depicts an image 702, an image 704, an image 706, a sphere feature 708, a logo feature 710, a crosswalk feature 712, and a sign feature 714.

The images 702/704/706 depicts images of locations with one or more features including one or more features associated with various objects in the environments depicted in the images 702/704/706 that have been identified by a computing system (e.g., a content analysis system including one or more machine learned models trained to detect one or more features of input content which can include or more images). For example, the computing system can include one or more aspects of the computing device 102, the server computing system 130, and/or the training computing system 150. Further, the one or more features of any of the images 702/704/706, including the sphere feature 708, the logo feature 710, the crosswalk feature 712, and the sign feature 714, can be associated with various semantic tags (e.g., semantic tags that include one or more features of the plurality of semantic tags described in the method 800 that is depicted in FIG. 8) that can include descriptions of various aspects of the one or more features. For example, the one or more features of any of the images 702/704/706 can be associated with one or more of a plurality of semantic tags based on image content analysis performed by one or more machine-learned models (e.g., the one or more machine-learned models 120 that are depicted in FIG. 1). Furthermore, any of the images 702/704/706 can be associated with location data (e.g., metadata included in the images 702/704/706) that can include a location (e.g. latitude, longitude, and/or altitude) that is associated with any of the images 702/704/706, features depicted in the images 702/704/706 (e.g., the sphere feature 708), and/or the vantage point from which any of the images 702/704/708 were captured.

The sphere feature 708 is visible from a variety of different perspectives including the different perspectives captured in the image 702 and the image 706 which can increase the visibility (e.g., the visibility to a carrier and/or passenger) of the sphere feature 708 and thereby increase the suitability of the sphere feature 708 for use as a feature of a meeting location for a carrier and a passenger. Furthermore, the sphere feature 708 is in close proximity to the crosswalk feature 712 depicted in the image 704, as indicated by the sign feature 714 which points in the direction of the crosswalk feature 712. Close proximity to the crosswalk feature 712 may increase the safety associated with a meeting location (e.g., a passenger can cross at a crosswalk instead of having to cross the road without a crosswalk). As such, the visibility and positioning of the sphere feature 708 can increase the likelihood that the associated location depicted in images 702/704/706 will be used as a meeting location.

The logo feature 710 is visible from a variety of different perspectives including the different perspectives captured in the image 702 and the image 706 which can increase the visibility (e.g., the visibility to a carrier and/or passenger) of the logo feature 710 and thereby increase the suitability of the logo feature 710 for use in determining a meeting location for a carrier and a passenger. Furthermore, the logo feature 710 is in close proximity to the crosswalk feature 712 depicted in the image 704, as indicated by the sign feature 714 which points in the direction of the crosswalk feature 712. The combination of the sphere feature 708 and the logo feature 710 may further increase the likelihood that the location containing those features will be determined to be a meeting location.

By way of example, the computing device 102 may generate instructions for a carrier and/or a passenger. The instructions generated by the computing device 102 can include descriptions of the sphere feature 708 (e.g., "a sphere that is half a meter high"), the logo feature (e.g., "a circular logo with a smaller filled in circle inside a larger hollow circle"), and the crosswalk feature (e.g., "a crosswalk next to the sphere").

FIG. 8 depicts a flow diagram of an example method for determining a meeting location in an environment according to example embodiments of the present disclosure. One or more portions of the method 800 can be executed or implemented on one or more computing devices or computing systems including, for example, the computing device 102, the server computing system 130, and/or the training computing system 150. Further, one or more portions of the method 800 can be executed or implemented as an algorithm on the hardware devices or systems disclosed herein. FIG. 8 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 802, the method 800 can include accessing location data and/or a plurality of semantic tags. The location data can include information associated with a plurality of locations (e.g., geographic locations including latitude, longitude, and/or altitude of each location) including a location (e.g., a set of geographic coordinates including latitude, longitude, and altitude) of one or more parties that can include a carrier (e.g., a driver of a vehicle) and a location of a passenger (e.g., a passenger in need of a vehicle to transport the passenger to another location). In some embodiments, the one or more parties can include one or more carriers and/or one or more passengers. Further, each of the one or more carriers and/or the one or more passengers can be located at various combinations of locations (e.g., several passengers at one location and several other passengers at another location).

In some embodiments, the location data can include information associated with the plurality of locations including one or more maps which can indicate the location of roads (e.g., streets, highways, and/or alleyways), buildings, bodies of water, waterways, bridges, tunnels, overpasses, and/or underpasses. Further, the location data can include information associated with traffic regulations (e.g., speed limits in a location, the locations of traffic lights, and/or the locations of stop signs), traffic flow patterns (e.g., the amount of vehicular traffic or pedestrian traffic in a location and/or area), and/or the locations of one or more hazards including construction zones.

In some embodiments, the plurality of semantic tags can include information associated with the one or more features of each location of the plurality of locations that are visible from other locations of the plurality of locations, a geographic location associated with each of the plurality of locations, and/or physical dimensions (e.g., an area in square meters) of each of the plurality of locations.

Further, the plurality of semantic tags can include information associated with one or more features (e.g., one or more features of a location of the plurality of locations) including: visual features (e.g., the appearance of one or more objects at a location of the plurality of locations); physical dimensions of one or more objects at a location of the plurality of locations; and/or object identities (e.g., the identity of objects at each location of the plurality of locations). Furthermore, the one or more features of the plurality of locations can include one or more features of: objects in each location of the plurality of locations including buildings, utility poles, trees, mail boxes, benches, and/or garbage cans; one or more surfaces of each location of the plurality of locations (e.g., paved roads, lawns, and/or bodies of water); traffic signage (e.g., traffic signs and/or traffic indications on roads); and/or light features including the location of street lights. Additionally, each of the plurality of semantic tags and/or the location data can be associated with information including: a location (e.g., a street address and/or an altitude, latitude, and/or longitude associated with a location and/or a semantic tag); a time of day (e.g., a time of day when a semantic tag was created, modified, and/or most recently accessed); and/or a date (e.g., a date when a semantic tag was generated, modified, and/or most recently accessed).

In some embodiments, each semantic tag of the plurality of semantic tags can be associated with one or more features depicted by an image of the plurality of images. For example, each semantic tag can provide one or more semantic descriptions of one or more objects included within a scene depicted by one of the plurality of images. The plurality of images can include one or more digital images (e.g., a two dimensional image) of a portion of an environment (e.g., an image of a portion of a location of the plurality of locations). Further, the plurality of images can be encoded in any type of image format including a combination of raster images (e.g., bitmaps comprising an array of pixels) and/or vector images (e.g., polygonal representations of images based on positions of coordinates including x and y axes of a two-dimensional plane). The images can include still images, image frames from a movie, and/or other types of imagery including LIDAR imagery, and/or RADAR imagery.

Examples of digital image formats used by the plurality of images can include JPEG (Joint Photographic Experts Group), BMP (Bitmap), TIFF (Tagged Image File Format), PNG (Portable Network Graphics), and/or GIF (Graphics Interchange Format). The images can be collected from various sources including user-submitted imagery, imagery in the public domain (e.g., anonymized imagery obtained via web crawl), and/or street-level panoramic imagery.

By way of example, the computing device 102 can receive data including information associated with the location data and/or the plurality of semantic tags via a communication network (e.g., a wireless and/or wired network including a LAN, WAN, or the Internet) through which one or more signals (e.g., electronic signals) and/or data can be sent and/or received.

At 804, the method 800 can include identifying the location data and/or the plurality of semantic tags that satisfy one or more meeting criteria associated with a suitability of a location for the carrier and the passenger. For example, the computing device 102 can access data and/or information associated with the location data and/or the plurality of semantic tags that include information associated with the one or more features of the plurality of locations that satisfy one or more meeting criteria associated with suitability of a location for the carrier and the passenger. Further, the computing device 102 can compare the location data and/or the semantic data to data associated with the one or more meeting criteria, and thereby identify the portions of the location data and/or the plurality of semantic tags that satisfy the one or more meeting criteria.

In some embodiments, the comparison (e.g., the comparison performed by the computing device 102) of the one or more features of each of the plurality of locations can include a comparison of the contents of the location data and/or each semantic tag to determine an extent to which the information in each semantic tag matches or is similar to the information in data associated with the criteria. Satisfaction of the one or more meeting criteria can include the contents of location data and/or a semantic tag matching a meeting criterion (e.g., a semantic tag indicates the presence of a fountain), exceeding a meeting criteria amount (e.g., the height of a feature exceeding a predetermined height threshold measured in meters), being less than a meeting criterion amount (e.g., the distance to the passenger is less than a distance threshold in meters), and/or being within a meeting criteria range (e.g., the brightness is within a brightness range that is not too bright and not too dim).

Furthermore, the suitability of a location for the carrier and/or the passenger can be associated with one or more other characteristics of the location including: the frequency of one or more features (e.g., how uncommon features at a location occur relative to other locations); the distinctiveness of one or more features at a location (e.g., the unusualness of a feature at a location); the prominence of one or more features at a location (e.g., the size and/or visibility of a feature at a location); the visual constancy of a feature at a location (e.g., the extent to which the appearance of a feature changes over time); the locational constancy of a feature of a location (e.g., will the feature remain in the same place over time); and/or the context of a feature of a location (e.g., the one or more features that are in close proximity or contact with a feature of a location).

Satisfaction of the one or more meeting criteria can be based, for example, on a feature being prominent (e.g., a large neon sign mounted on a tall pole) or having sufficient capacity. Thus, in one example, an image content analysis system can be used to determine the capacity of a location, which can then be used to guide selection of a location for use as a meeting location. For example, for each location, the capacity of the location can be determined based at least in part on location data indicating the physical dimensions of the location and/or semantic tags that can indicate a desired capacity at a location (e.g., semantic tags indicating the seating capacity of a recreational area).

At 806, the method 800 can include determining one or more meeting locations for the carrier and the passenger based at least in part on the location data and/or the plurality of semantic tags that satisfy the one or more meeting criteria. For example, the computing device 102 can determine one or more geographic locations that are associated with the location data and/or the plurality of semantic tags that satisfy the one or more meeting criteria. The computing device 102 can then use one or more techniques (e.g., clustering techniques) to determine a meeting location based on the one or more geographic locations associated with the plurality of semantic tags that satisfy the one or more meeting criteria.

By way of example, determining the one or more meeting locations can be based at least in part on a weighted combination of: the safety of a location (e.g., locations that are safely accessible to a pedestrian via a crosswalk and/or sidewalk); the proximity of a location (e.g., how far away meeting location is from the carrier and/or the passenger); the visibility of a location (e.g., how easily a location can be seen by a carrier and/or a passenger); and/or the accessibility of a location (e.g., how easily and/or conveniently the meeting location can be accessed by a pedestrian and/or a vehicle).

In some embodiments, the one or more meeting locations can be based at least in part on the application of one or more secondary criteria to reduce the number of the one or more meeting locations. For example, the computing device 102 can determine that the one or more meeting locations are within a predetermined distance (e.g., within fifteen meters) of the location of a crosswalk and/or a parking space for a vehicle. As such, any of the locations further than fifteen meters from a crosswalk or parking space are not determined to be a meeting location. By way of further example, the computing device 102 can determine that the one or more meeting locations are within a predetermined distance (e.g., within one hundred meters) of the location of the passenger. In this way, the distance that a passenger travels to a meeting location can be minimized.

At 808, the method 800 can include generating one or more indications associated with at least one meeting location based at least in part on the one or more features of the at least one meeting location of the one or more meeting locations. Further, the amount of meeting locations included in the at least one meting location of the one or more meeting locations can be a predetermined amount (e.g., a single meeting location, a predetermined portion of the one or more meeting locations, or a predetermined number of the one or more meeting locations) or based at least in part on one or more criteria (e.g., the meeting location that is closest to the passenger).

By way of example, the computing device 102 can generate one or more textual indications including the address of a meeting location and one or more visual indications including an image (e.g., a photograph of the meeting location that was retrieved from an image repository) that can be displayed on a display device of the for the carrier and/or the passenger.

In some embodiments, the one or more indications can include one or more textual descriptions of the one or more meeting locations (e.g., a natural language written description of the one or more meeting locations), one or more auditory descriptions of the one or more meeting locations (e.g., auditory descriptions generated through a speaker of a device used by the carrier and/or the passenger), or one or more images of the one or more meeting locations (e.g., photographs of the one or more meeting locations).

At 810, the method 800 can include generating one or more descriptions of the plurality of locations within a predetermined distance of the at least one location. For example, the computing device 102 can generate one or more descriptions of the one or more features (e.g., features of buildings) associated with the plurality of semantic tags that are associated with the plurality of locations within the predetermined distance of the at least one location. By way of further example, the computing device 102 can generate one or more natural language descriptions including one or more natural language textual descriptions (e.g., natural language textual descriptions generated on a display device associated with the computing device 102) and/or one or more audible descriptions (e.g., natural language audible descriptions using a synthetic voice and/or a pre-recorded voice).

Figure 9:
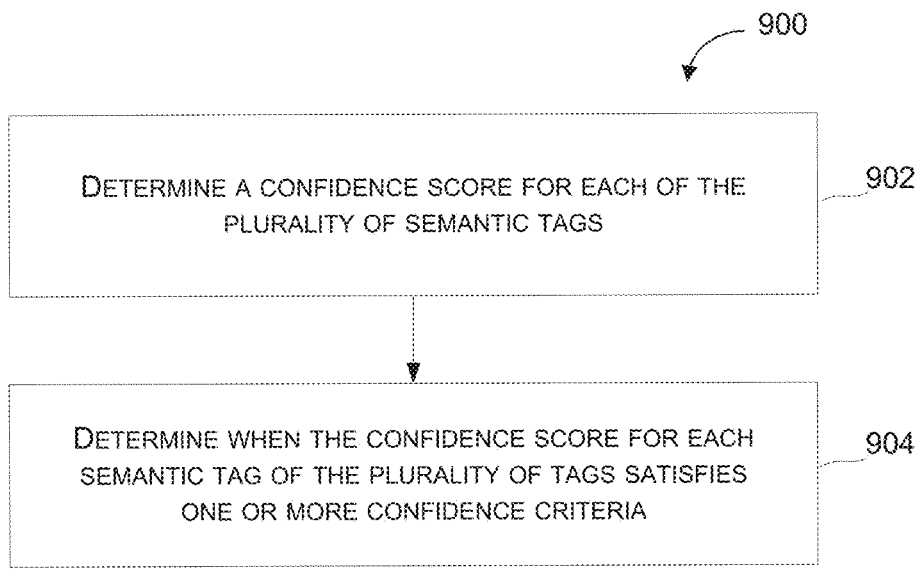
FIG. 9 depicts a flow diagram of an example method for determining a meeting location in an environment according to example embodiments of the present disclosure.

FIG. 9 depicts a flow diagram of an example method for determining a meeting location in an environment according to example embodiments of the present disclosure. One or more portions of the method 900 can be executed or implemented on one or more computing devices or computing systems including, for example, the computing device 102, the server computing system 130, and/or the training computing system 150. Further, one or more portions of the method 900 can be executed or implemented as an algorithm on the hardware devices or systems disclosed herein. In some embodiments, one or more portions of the method 900 can be performed as part of the method 804 that is depicted in FIG. 8. Further, one or more portions of the method 900 can be performed as part of identifying the location data and/or the plurality of semantic tags that satisfy one or more meeting criteria associated with a suitability of a location for the carrier and the passenger as described in 804 of the method 800 that is depicted in FIG. 8. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include determining a confidence score for each of the plurality of semantic tags based at least in part on a number of times that each of the plurality of semantic tags has been associated with a respective location of the plurality of locations. The confidence score for each of the plurality of semantic tags can be associated with an accuracy (e.g., an extent to which a semantic tag correctly describes the state of a feature) of each of the plurality of semantic tags respectively. Further, a higher or increased confidence score can correspond to a semantic tag that more accurately describes the actual state of the feature.

For example, the computing device 102 can access data associated with the number of times that a semantic tag associated with a feature (e.g., the fountain feature 306 that is depicted in FIG. 3) has also been associated with geographic data corresponding to a location (e.g., latitude and longitude information). The computing device 102 can then generate a confidence score corresponding to the number of times the semantic tag associated with a feature has also been associated with geographic data corresponding to a location.

In some embodiments, the confidence score for each respective semantic tag of the plurality of semantic tags can be negatively correlated with an age of the semantic tag. For example, the computing device 102 can access data associated with the time at which each of the plurality of semantic tags was generated and determine that the confidence score for a semantic tag is increased by an amount proportional to how recently the semantic tag was generated (e.g., more recently generated semantic tags have a higher confidence score indicative of greater confidence in the accuracy of the semantic tag).

At 904, the method 900 can include determining when the confidence score for each semantic tag of the plurality of semantic tags satisfies one or more confidence criteria. For example, the computing device 102 can determine that only semantic tags with a confidence score exceeding a confidence score threshold are included in the determination of the one or more meeting locations.

Figure 10:
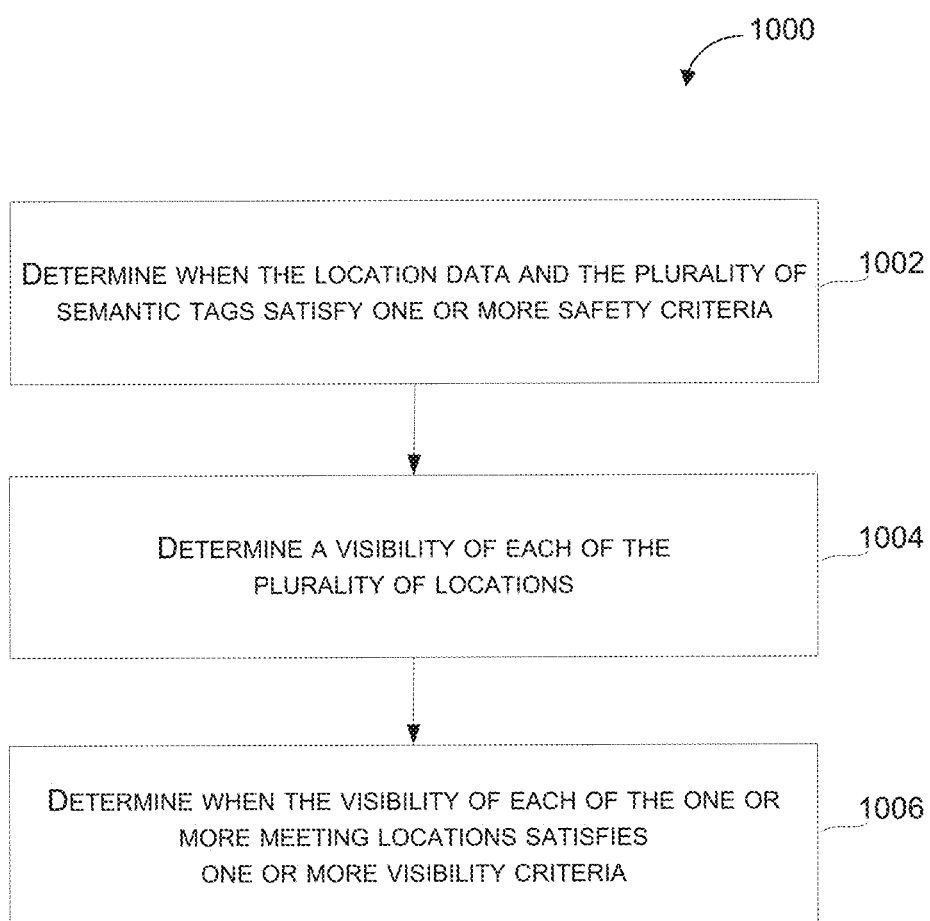
FIG. 10 depicts a flow diagram of an example method for determining a meeting location in an environment according to example embodiments of the present disclosure.

FIG. 10 depicts a flow diagram of an example method for determining a meeting location in an environment according to example embodiments of the present disclosure. One or more portions of the method 1000 can be executed or implemented on one or more computing devices or computing systems including, for example, the computing device 102, the server computing system 130, and/or the training computing system 150. Further, one or more portions of the method 1000 can be executed or implemented as an algorithm on the hardware devices or systems disclosed herein. In some embodiments, one or more portions of the method 1000 can be performed as part of the method 800 that is depicted in FIG. 8. Further, one or more portions of the method 1000 can be performed as part of identifying the location data and/or the plurality of semantic tags that satisfy one or more meeting criteria associated with a suitability of a location for the carrier and the passenger as described in 804 of the method 800 that is depicted in FIG. 8. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can include determining when the location data and/or the plurality of semantic tags satisfy one or more safety criteria. For example, the computing device 102 can use the location data to determine the location of each of one or more meeting locations. Further, the computing device 102 can then determine that the location data indicates that the one or more meeting locations are not in a higher risk and/or lower safety location (e.g., a construction zone, in the middle of a highway, or at the edge of a cliff). By way of further example, the computing device 102 can access the plurality of semantic tags to determine that the plurality of semantic tags associated with the one or more meeting locations do not include any semantic tags that are associated with potentially unsafe conditions including falling rocks, wildlife, and/or heavy machinery.

At 1004, the method 1000 can include determining a respective visibility associated with each semantic tag of the plurality of semantic tags. For example, the computing device 102 can access semantic tags (e.g., semantic tags indicating the presence of street lamps) that includes information indicating that a location is in an area with a large number of street lamps that can improve the visibility of a location at night. By way of further example, the computing device 102 can access a semantic tag that includes information indicating that a feature (e.g., a fountain) is not obstructed by other objects proximate the feature which can improve the visibility of the feature associated with the semantic tag.

In some embodiments, the visibility of each semantic tag can be associated with a numerical score or other numerical value (e.g., a visibility score or visibility value). Further, a higher or increased visibility score or visibility value can correspond to a location that is more visible to a carrier and/or passenger and can correspond to a greater likelihood that a location is used as a meeting location.

At 1006, the method 1000 can include determining when the respective visibility associated with each semantic tag of the plurality of semantic tags satisfies one or more visibility criteria. For example, the computing device 102 can determine that a visibility criterion is satisfied when a location includes at least one street lamp and/or illuminated building is within a predetermined distance of a street light.

In some embodiments, determining that the visibility of the one or more meeting locations satisfies one or more visibility criteria can include determining that an amount of light (e.g., an amount of light in lux) at the one or more meeting locations exceeds a light threshold, determining that a size (e.g., physical dimensions) of the one or more features associated with the one or more meeting locations exceeds a size threshold, determining that a number of the plurality of locations from which a meeting location of the one or more meeting locations is visible exceeds a location visibility threshold, and/or determining that a number of the plurality of locations visible from a meeting location of the one or more meeting locations exceeds a vantage location visibility threshold.

Figure 11:
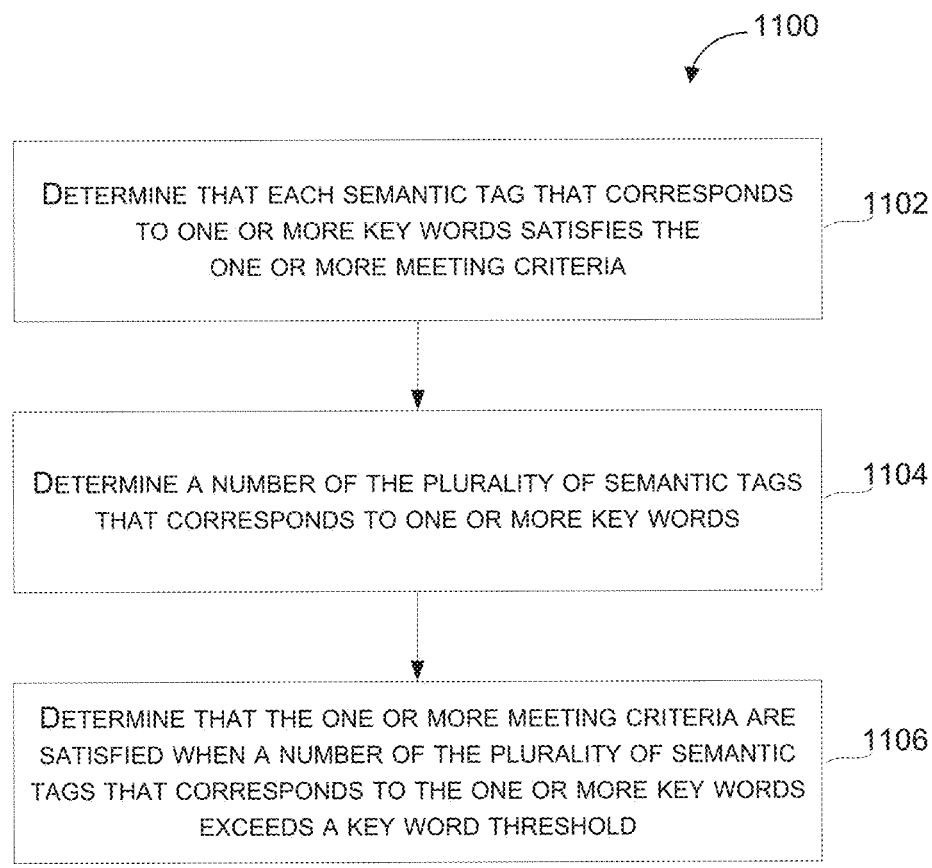
FIG. 11 depicts a flow diagram of an example method for determining a meeting location in an environment according to example embodiments of the present disclosure.

FIG. 11 depicts a flow diagram of an example method for determining a meeting location in an environment according to example embodiments of the present disclosure. One or more portions of the method 1100 can be executed or implemented on one or more computing devices or computing systems including, for example, the computing device 102, the server computing system 130, and/or the training computing system 150. Further, one or more portions of the method 1100 can be executed or implemented as an algorithm on the hardware devices or systems disclosed herein. In some embodiments, one or more portions of the method 1100 can be performed as part of the method 800 that is depicted in FIG. 8. Further, one or more portions of the method 1100 can be performed as part of identifying the location data and/or the plurality of semantic tags that satisfy one or more meeting criteria associated with a suitability of a location for the carrier and the passenger as described in 804 of the method 800 that is depicted in FIG. 8. FIG. 11 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1102, the method 1100 can include determining that each semantic tag of the plurality of semantic tags that corresponds to one or more key words (e.g., matches, is synonymous with, and/or includes one or more similar characteristics) satisfies the one or more meeting criteria. For example, the computing device 102 can determine that the one or more meeting criteria are satisfied when the semantic tags match one or more key words including "restaurant", "bus stop", and/or "fountain". Further, a semantic tag corresponding to a key word can include exact correspondence (e.g., a "fountain" semantic tag matching the key word "fountain") as well as partial matches (e.g., "Grand Central" can correspond to the key words "Grand Central Terminal").

In some embodiments, the one or more key words can be associated with one or more features that are visually prominent (e.g., tall, large, and/or bright features) and/or one or more features that occur at a rate below a keyword rate threshold (e.g., unique, uncommon, or rare features).

At 1104, the method 1100 can include determining a number of the plurality of semantic tags that corresponds to one or more key words. For example, the computing device 102 can compare information in each of the plurality of semantic tags to one or more key words in order to determine when a semantic tag corresponds to a key word. Further, the computing device 102 can increment a key word counter by one each time a semantic tag corresponds to a key word. In this way the computing device 102 can keep count of the number of semantic tags that correspond to the one or more key words.

At 1106, the method 1100 can include determining that the one or more meeting criteria are satisfied when the number of the plurality of semantic tags that corresponds to the one or more key words exceeds a key word threshold. For example, the computing device 102 can determine that the one or more meeting criteria are satisfied when three or more of the semantic tags correspond to the one or more key words.

In some embodiments, certain key words can be weighted so that a semantic tag corresponding to certain key words can have a greater impact on satisfying the key word threshold. For example, the computing device 102 can determine that the word "fountain" alone can be weighted as three keywords and will satisfy a keyword threshold that requires three or more key words.

Figure 12:
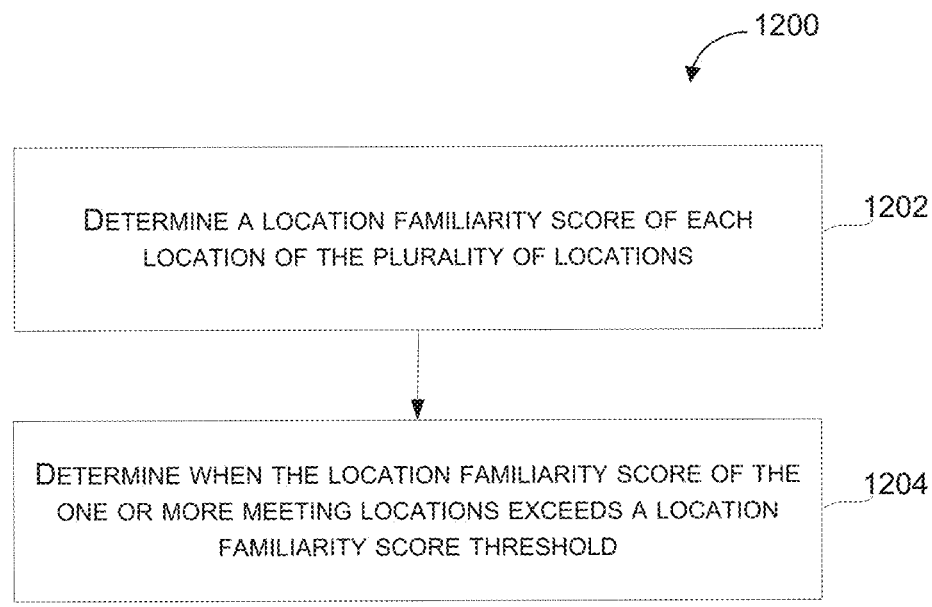
FIG. 12 depicts a flow diagram of an example method for determining a meeting location in an environment according to example embodiments of the present disclosure.

FIG. 12 depicts a flow diagram of an example method for determining a meeting location in an environment according to example embodiments of the present disclosure. One or more portions of the method 1200 can be executed or implemented on one or more computing devices or computing systems including, for example, the computing device 102, the server computing system 130, and/or the training computing system 150. Further, one or more portions of the method 1200 can be executed or implemented as an algorithm on the hardware devices or systems disclosed herein. In some embodiments, one or more portions of the method 1200 can be performed as part of the method 800 that is depicted in FIG. 8. Further, one or more portions of the method 1200 can be performed as part of determining one or more meeting locations for the carrier and the passenger based at least in part on the location data and/or the plurality of semantic tags that satisfy the one or more meeting criteria as described in 806 of the method 800 that is depicted in FIG. 8. FIG. 12 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1202, the method 1200 can include determining a location familiarity score of each location of the plurality of locations based at least in part on a number of times the carrier or the passenger have previously been within a predetermined distance of each location of the plurality of locations. Further, the determination of the location familiarity score, locations visited by the carrier and/or passenger, and/or the number of times the carrier and/or passenger have previously been within a predetermined distance of each location can be based in part on information that has been voluntarily provided by the carrier and/or passenger respectively. For example, the carrier and/or the passenger can receive a clear request (e.g., "May information about the locations or areas that you visit or travel past be recorded for future use?") asking the carrier and/or passenger for express permission to use information about the locations that the carrier and/or passenger have visited, travelled past, and/or been within a predetermined distance of. Additionally, any data and/or information associated with the locations visited by the carrier and/or passenger can be modified before being stored or used, so that personally identifiable information is removed.

In some embodiments, a higher or increased location familiarity score can correspond to a location that is more familiar to a carrier and/or passenger and can correspond to a greater likelihood that a location is used as a meeting location. For example, in some implementations, a user can provide authorization for the computing device 102 to access a list of previously visited locations. For example, the computing device 102 can access location history data associated with previously visited locations of a carrier and/or a passenger. Further, the computing device 102 can compare the previously visited locations of the carrier and/or the passenger to the plurality of locations and determine that the location familiarity score will increase each time a carrier and/or passenger have previously been within twenty-five meters of a location.

At 1204, the method 1200 can include determining when the location familiarity score of the one or more meeting locations satisfies one or more location familiarity criteria. For example, a higher location familiarity score can correspond to a greater level of familiarity with a location on the part of a carrier and/or passenger. Further, the computing device 102 can determine that the one or more location familiarity criteria are satisfied when the location familiarity score exceeds a location familiarity score threshold.

Figure 13:
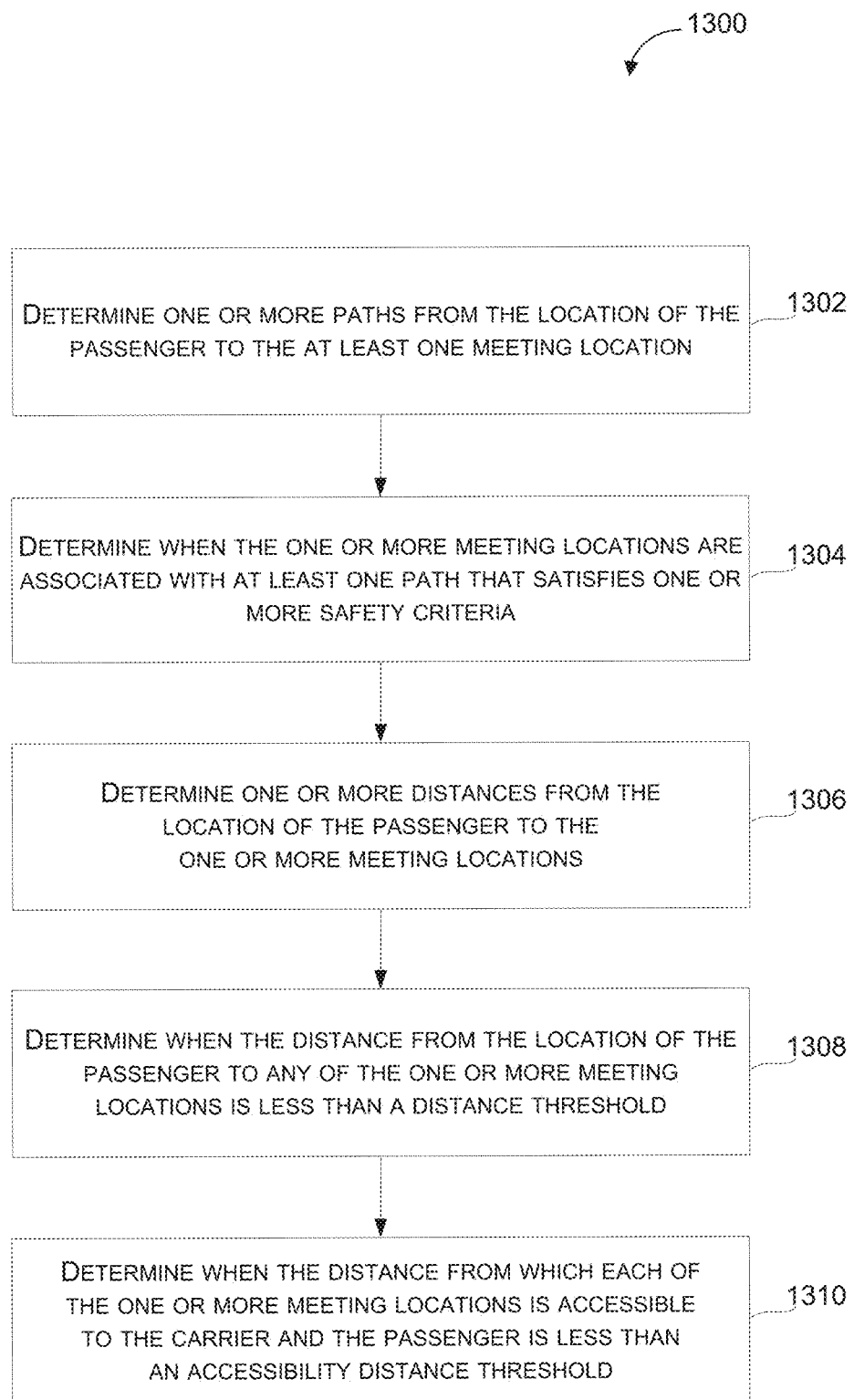
FIG. 13 depicts a flow diagram of an example method for determining a meeting location in an environment according to example embodiments of the present disclosure.

FIG. 13 depicts a flow diagram of an example method for determining a meeting location in an environment according to example embodiments of the present disclosure. One or more portions of the method 1300 can be executed or implemented on one or more computing devices or computing systems including, for example, the computing device 102, the server computing system 130, and/or the training computing system 150. Further, one or more portions of the method 1300 can be executed or implemented as an algorithm on the hardware devices or systems disclosed herein. In some embodiments, one or more portions of the method 1300 can be performed as part of the method 800 that is depicted in FIG. 8. Further, one or more portions of the method 1300 can be performed as part of determining one or more meeting locations for the carrier and the passenger based at least in part on the location data and/or the plurality of semantic tags that satisfy the one or more meeting criteria as described in 806 of the method 800 that is depicted in FIG. 8. FIG. 13 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1302, the method 1300 can include determining one or more paths from the location of the carrier and/or the passenger to the one or more meeting locations. For example, the computing device 102 can access map information in the location data to determine one or more paths from the current location of the carrier and/or the passenger to the one or more meeting locations via one or more streets. Further, the one or more paths can be based on the roads, streets, and/or sidewalks between the location of the carrier and/or passenger and the one or more meeting locations that do not violate traffic regulations.

At 1304, the method 1300 can include determining when the one or more meeting locations are associated with at least one path of the one or more paths that satisfies one or more safety criteria. For example, the computing device 102 can determine that the one or more meeting locations is associated with (e.g., connected to and accessed by) a path that does not cross any hazards (e.g., a construction zone).

In some embodiments, satisfying the one or more safety criteria can include a rate of road crossings on the at least one path not exceeding a threshold rate of road crossings, an amount of light along the at least one path exceeding a threshold amount of light (e.g., the amount of light along the path can be determined based at least in part on the time of day and/or the amount of street lights along the path), a portion of the at least one path that includes a sidewalk, and/or the at least one path not crossing a hazard (e.g., a construction area).

At 1306, the method 1300 can include determining one or more distances from the location of the carrier and/or the passenger to the one or more meeting locations. For example, the computing device 102 can access map information in the location data to determine one or more distances (e.g., one or more distances in meters) from the current location of the passenger to each of the one or more meeting locations.

At 1308, the method 1300 can include determining when the distance from the location of the passenger and/or carrier to any of the one or more meeting locations is less than a distance threshold. For example, the computing device 102 can determine that the distance to any of the one or more meeting locations is less than an initial distance between the location of the carrier and the location of the passenger and/or a distance threshold based at least in part on the initial distance between the carrier and the passenger (e.g., the one or more meeting locations are not further away from either the carrier or the passenger than fifty percent of the initial distance between the carrier and the passenger). By way of further example, the computing device 102 can determine that the one or more meeting locations are not more than two hundred meters away from the location of the passenger.

At 1310, the method 1300 can include determining when the one or more meeting criteria are satisfied when a distance from which each location of the one or more meeting locations is accessible to the carrier and/or the passenger is less than an accessibility distance threshold. For example, the computing device 102 can access the location data to determine a distance (e.g., a distance in meters) around a location that both a carrier (e.g., a driver in a vehicle constrained to driving on roads) and a passenger (e.g., a pedestrian) can access (e.g., a distance within which a car can legally drive and a pedestrian can walk without encountering vehicular traffic). Further, the computing device 102 can determine that the distance from which each location of the one or more meeting locations is less than an accessibility distance. For example, the computing device 102 can determine that a meeting location (e.g., a bus stop accessible next to a side walk and a road) is within a distance threshold of less than twenty meters.

Figure 14:
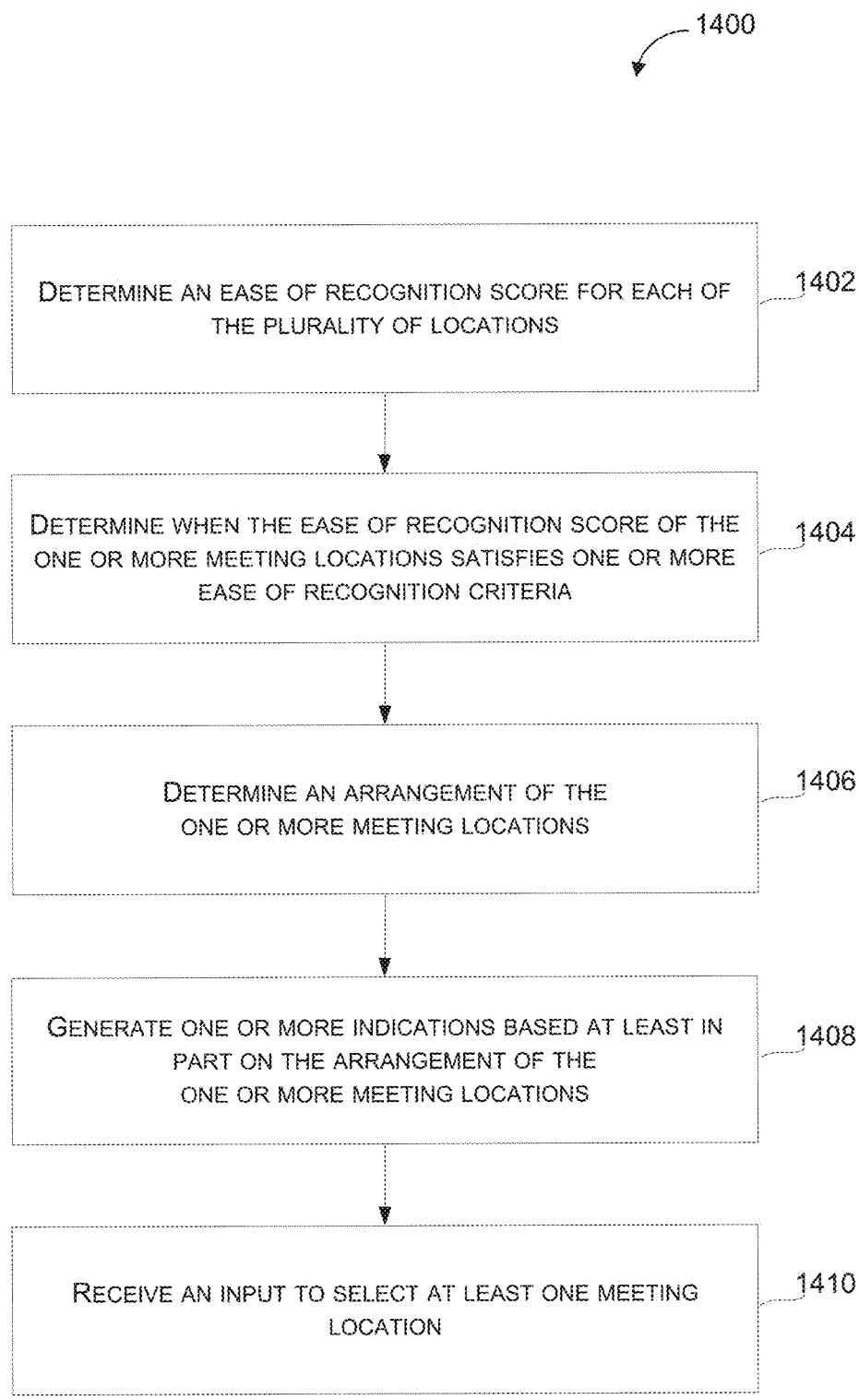
FIG. 14 depicts a flow diagram of an example method for determining a meeting location in an environment according to example embodiments of the present disclosure.

FIG. 14 depicts a flow diagram of an example method for determining a meeting location in an environment according to example embodiments of the present disclosure. One or more portions of the method 1400 can be executed or implemented on one or more computing devices or computing systems including, for example, the computing device 102, the server computing system 130, and/or the training computing system 150. Further, one or more portions of the method 1400 can be executed or implemented as an algorithm on the hardware devices or systems disclosed herein. In some embodiments, one or more portions of the method 1400 can be performed as part of the method 800 that is depicted in FIG. 8. Further, one or more portions of the method 1400 can be performed as part of identifying the location data and/or the plurality of semantic tags that satisfy one or more meeting criteria associated with a suitability of a location for the carrier and the passenger as described in 804 of the method 800 that is depicted in FIG. 8. FIG. 14 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1402, the method 1400 can include determining an case of recognition score for each semantic tag of the plurality of semantic tags, wherein the case of recognition is associated with the one or more features that are visually prominent or the one or more features that occur at a rate below an occurrence rate threshold.

In some embodiments, a higher or increased ease of recognition score can correspond to a location that is more easily recognized by a carrier and/or passenger and can correspond to a greater likelihood that a location is used as a meeting location. For example, the computing device 102 can determine that the case of recognition score for a location with three visually prominent features (e.g., three large bronze statues) will be higher than the case of recognition score of a location with one bronze statue of the same size that is otherwise similar in appearance. By way of further example, the computing device 102 can determine that the case of recognition score for a location with a visually prominent feature (e.g., a large fountain with sculptures of lions) will be higher than the case of recognition score of a location that lacks a fountain and is otherwise similar in appearance.

At 1404, the method 1400 can include determining when the case of recognition score of each semantic tag of the plurality of semantic tags satisfies one or more case of recognition criteria. For example, the computing device 102 can compare each case of recognition score to an case of recognition threshold and determine that each semantic tag that exceeds an case of recognition threshold satisfies the one or more case of recognition criteria.

At 1406, the method 1400 can include determining an arrangement (e.g., a ranking and/or way of positioning the one or more meeting locations) of the one or more meeting locations based at least in part on the case of recognition score associated with each of the one or more meeting locations. For example, the computing device 102 can determine an arrangement of the one or more meeting locations in which the one or more meeting locations associated with higher case of recognition scores are positioned higher on the vertical axis of a display than the one or more meeting locations with lower case of recognition scores.

By way of further example, the computing device 102 can determine an arrangement of the one or more meeting locations in which audible indications of the one or more meeting locations associated with higher case of recognition scores are generated through a speaker device before the one or more meeting locations with lower case of recognition scores.

At 1408, the method 1400 can include generating one or more indications including the one or more one or more meeting locations arranged based at least in part on the arrangement of the one or more meeting locations. For example, the computing device 102 can generate auditory indications with the higher meeting locations associated with higher case of recognition scores generated before the meeting locations associated with lower case of recognition scores.

At 1410, the method 1400 can include receiving an input to select at least one meeting location of the one or more meeting locations for the carrier or the passenger. For example, the computing device 102 can include a touch screen display that can display the textual indications of the one or more meeting locations and receive a touch input from a passenger to select one of the meeting locations as the meeting location at which the passenger desires to meet the carrier. By way of further example, the computing device 102 can include a microphone that can detect speech from a passenger indicating that the passenger selected one meeting location of the one or more meeting locations as the meeting location at which the passenger desires to meet the carrier.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method of providing navigational instructions, the method comprising:
accessing, by a computing system comprising one or more processors, location data and a plurality of semantic tags associated with one or more features of a plurality of locations, wherein the location data is associated with the plurality of locations and comprises a location of a carrier and a location of a passenger;
determining, by the computing system, a confidence score for each of the plurality of semantic tags;
identifying, by the computing system, the location data that satisfies one or more meeting criteria and the plurality of semantic tags that satisfy the one or more meeting criteria and have confidence scores that satisfy one or more confidence criteria;

determining, by the computing system, one or more meeting locations for the carrier and the passenger based at least in part on the location data that satisfies the one or more meeting criteria and the plurality of semantic tags that satisfy the one or more meeting criteria and have confidence scores that satisfy one or more confidence criteria; and generating, by the computing system, one or more indications associated with at least one meeting location of the one or more meeting locations.

2. The computer-implemented method of claim 1, wherein the confidence score for each of the plurality of semantic tags is associated with an accuracy of each of the plurality of semantic tags.

3. The computer-implemented method of claim 1, wherein the confidence score for each of the plurality of semantic tags is based at least in part on a number of times that each semantic tag of the plurality of semantic tags has been associated with a respective location of the plurality of locations.

4. The computer-implemented method of claim 1, wherein the confidence score for each of the plurality of semantic tags is negatively correlated with an age of each of the plurality of semantic tags.

5. The computer-implemented method of claim 1, wherein the confidence score for each of the plurality of semantic tags is based at least in part on an extent to which each of the plurality of semantic tags correctly describes a state of the one or more features of the plurality of locations.

6. The computer-implemented method of claim 1, wherein the satisfying the one or more confidence criteria comprises the confidence score exceeding a confidence score threshold.

7. The computer-implemented method of claim 1, wherein the one or more meeting criteria are associated with a suitability of a location for the carrier and the passenger.

8. The computer-implemented method of claim 1, further comprising:
    determining, by the computing system, one or more distances from a location of the passenger to the one or more meeting locations; and
    determining, by the computing system, that the one or more meeting criteria are satisfied when a distance from which the plurality of locations are accessible to the passenger is less than an accessibility distance threshold.

9. The computer-implemented method of claim 1, further comprising:
    determining, by the computing system, one or more distances from the location of the carrier to the one or more meeting locations; and
    determining, by the computing system, that the one or more meeting criteria are satisfied when a distance from which the plurality of locations are accessible to the carrier is less than an accessibility distance threshold.

10. The computer-implemented method of claim 1, wherein the identifying, by the computing system, the location data that satisfies one or more meeting criteria and the plurality of semantic tags that satisfy the one or more meeting criteria and have confidence scores that satisfy one or more confidence criteria comprises:
    determining, by the computing system, a respective visibility associated with each semantic tag of the plurality of semantic tags; and
    determining, by the computing system, when the respective visibility associated with each semantic tag of the plurality of semantic tags satisfies one or more visibility criteria.

11. The computer-implemented method of claim 10, wherein the determining, by the computing system, when the respective visibility of the one or more meeting locations satisfies one or more visibility criteria comprises:
    determining, by the computing system, when an amount of light at the one or more meeting locations exceeds a light threshold,
    determining, by the computing system, when a size of the one or more features associated with the one or more meeting locations exceeds a size threshold,
    determining, by the computing system, when a number of the plurality of locations from which a meeting location of the one or more meeting locations is visible exceeds a location visibility threshold, or
    determining, by the computing system, when a number of the plurality of locations visible from a meeting location of the one or more meeting locations exceeds a vantage location visibility threshold.

12. The computer-implemented method of claim 1, wherein the identifying, by the computing system, the location data that satisfies one or more meeting criteria and the plurality of semantic tags that satisfy the one or more meeting criteria and have confidence scores that satisfy one or more confidence criteria comprises:
    determining, by the computing system, that each semantic tag that corresponds to one or more key words satisfies the one or more meeting criteria.

13. The computer-implemented method of claim 12, wherein the one or more key words are associated with one or more features that are visually prominent or one or more features that occur at a rate below a keyword rate threshold.

14. The computer-implemented method of claim 1, wherein the identifying, by the computing system, the location data that satisfies one or more meeting criteria and the plurality of semantic tags that satisfy the one or more meeting criteria and have confidence scores that satisfy one or more confidence criteria comprises:
    determining, by the computing system, a number of the plurality of semantic tags that corresponds to one or more key words; and
    determining, by the computing system, that the one or more meeting criteria are satisfied when the number of the plurality of semantic tags that corresponds to the one or more key words exceeds a key word threshold.

15. One or more tangible non-transitory computer-readable media storing computer-readable instructions that when executed by one or more processors cause the one or more processors to perform operations, the operations comprising:
    accessing location data and a plurality of semantic tags associated with one or more features of a plurality of locations, wherein the location data is associated with the plurality of locations and comprises a location of a carrier and a location of a passenger;
    determining a confidence score for each of the plurality of semantic tags;
    identifying the location data that satisfies one or more meeting criteria and the plurality of semantic tags that satisfy the one or more meeting criteria and have confidence scores that satisfy one or more confidence criteria;
    determining one or more meeting locations for the carrier and the passenger based at least in part on the location data that satisfies the one or more meeting criteria and the plurality of semantic tags that satisfy the one or more meeting criteria and have confidence scores that satisfy one or more confidence criteria; and generating one or more indications associated with at least one meeting location of the one or more meeting locations.

16. The one or more tangible non-transitory computer-readable media of claim 15, wherein the identifying the location data that satisfies one or more meeting criteria and the plurality of semantic tags that satisfy the one or more meeting criteria and have confidence scores that satisfy one or more confidence criteria comprises:

determining a respective ease of recognition score for each semantic tag of the plurality of semantic tags, wherein the respective ease of recognition score is associated with the one or more features that are visually prominent or the one or more features that occur at a rate below an occurrence rate threshold; and determining when the respective ease of recognition score of each semantic tag of the plurality of semantic tags satisfies one or more ease of recognition criteria.

17. The one or more tangible non-transitory computer-readable media of claim 16, further comprising:

determining an arrangement of the one or more meeting locations based at least in part on the respective ease of recognition score associated with each of the plurality of semantic tags;

generating one or more indications based at least in part on the arrangement of the one or more meeting locations; and receiving an input to select at least one meeting location of the one or more meeting locations for the carrier or the passenger.

18. A computing system comprising:

one or more processors;

one or more non-transitory computer-readable media storing instructions that when executed by the one or more processors cause the one or more processors to perform operations comprising:

accessing location data and a plurality of semantic tags associated with one or more features of a plurality of locations, wherein the location data is associated with the plurality of locations and comprises a location of a carrier and a location of a passenger;

determining a confidence score for each of the plurality of semantic tags;

identifying the location data that satisfies one or more meeting criteria and the plurality of semantic tags that satisfy the one or more meeting criteria and have confidence scores that satisfy one or more confidence criteria;

determining one or more meeting locations for the carrier and the passenger based at least in part on the location data that satisfies the one or more meeting criteria and the plurality of semantic tags that satisfy the one or more meeting criteria and have confidence scores that satisfy one or more confidence criteria; and generating one or more indications associated with at least one meeting location of the one or more meeting locations.

19. The computing system of claim 18, wherein the generating one or more indications associated with at least one meeting location of the one or more meeting locations comprises:

generating one or more descriptions of the plurality of locations within a predetermined distance of the at least one meeting location.

20. The computing system of claim 18, wherein the identifying the location data that satisfies one or more meeting criteria and the plurality of semantic tags that satisfy the one or more meeting criteria and have confidence scores that satisfy one or more confidence criteria comprises:

determining when the location data and the plurality of semantic tags satisfy one or more safety criteria.

* * * * *